(12) United States Patent
Otani

(10) Patent No.: US 11,904,846 B2
(45) Date of Patent: Feb. 20, 2024

(54) REMOTE PARKING APPARATUS

(71) Applicant: TOYOTA JIDOSHA KABUSHIKI KAISHA, Aichi-ken (JP)

(72) Inventor: Shinya Otani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/835,479

(22) Filed: Jun. 8, 2022

(65) Prior Publication Data

US 2022/0410874 A1 Dec. 29, 2022

(30) Foreign Application Priority Data

Jun. 28, 2021 (JP) ................. 2021-106815

(51) Int. Cl.

| | | |
|---|---|---|
| H04N 5/44 | (2011.01) | |
| B60W 30/06 | (2006.01) | |
| B60W 50/14 | (2020.01) | |
| G08G 1/14 | (2006.01) | |
| G08G 1/16 | (2006.01) | |
| H04W 4/40 | (2018.01) | |
| G05D 1/00 | (2006.01) | |

(52) U.S. Cl.
CPC ............ *B60W 30/06* (2013.01); *B60W 50/14* (2013.01); *G05D 1/0016* (2013.01); *G08G 1/144* (2013.01); *G08G 1/168* (2013.01); *H04W 4/40* (2018.02); *B60W 2050/143* (2013.01); *B60W 2050/146* (2013.01); *B60W 2556/50* (2020.02); *G05D 2201/0213* (2013.01)

(58) Field of Classification Search
CPC .. B60W 30/06; B60W 50/14; B60W 2556/50; G08G 1/144; G08G 1/168
See application file for complete search history.

(56) References Cited

U.S. PATENT DOCUMENTS

| | | | |
|---|---|---|---|
| 10,392,022 B1 * | 8/2019 | Rau ...................... | B60W 40/09 |
| 11,231,706 B1 * | 1/2022 | Curlander ............... | B25J 5/005 |
| 2017/0297577 A1 * | 10/2017 | Tsuji ..................... | F16H 61/16 |
| 2020/0398826 A1 | 12/2020 | Tsujino et al. | |
| 2021/0229509 A1 * | 7/2021 | Raeis Hosseiny ....... | B60D 1/26 |
| 2021/0253134 A1 * | 8/2021 | Heimberger .......... | B60W 50/10 |
| 2022/0365527 A1 * | 11/2022 | Suzuki .................. | G06F 3/0488 |
| 2023/0128580 A1 * | 4/2023 | Heim ................. | B62D 15/0285 |
| | | | 701/2 |

FOREIGN PATENT DOCUMENTS

JP 2021-000972 A 1/2021

* cited by examiner

*Primary Examiner* — Munear T Akki
(74) *Attorney, Agent, or Firm* — Sughrue Mion, PLLC

(57) ABSTRACT

A remote parking apparatus comprises an electronic control unit which executes a remote parking control to move an own vehicle and park the own vehicle in a designated parking space in response to receiving a signal transmitted wirelessly from an operation terminal. The electronic control unit is configured to set a parking space as the designated parking space even when there is an obstacle interrupting parking the own vehicle in the parking space.

8 Claims, 19 Drawing Sheets

REMOTE PARKING APPARATUS

CROSS-REFERENCE TO RELATED APPLICATIONS

This application claims priority to Japanese patent application No. JP 2021-106815 filed on Jun. 28, 2021, the content of which is hereby incorporated by reference in its entirety.

BACKGROUND

Field

The invention relates to a remote parking apparatus.

Description of the Related Art

There is known a remote parking apparatus which autonomously parks an own vehicle in a designated parking space. One of the remote parking apparatuses sets an area where there is no object or obstacle which may interrupt moving of the own vehicle as the designated parking space and autonomously parks the own vehicle in the designated parking space (for example, see JP 2021-972 A).

Further, another remote parking apparatus parks the own vehicle in the designated parking space in response to operations applied to an operation terminal by a driver of the own vehicle from the outside of the own vehicle. When the remote parking apparatus is configured to set the area where there is no obstacle as the designated parking space, and there is a pylon in the area to be designated as the designated parking space or the area to be designated as the designated parking space is closed by a retractable gate fence, the driver needs to take bothersome actions of getting out of the own vehicle and removing the pylon from the area to be set as the designated parking space or retracting the retractable gate fence, thereafter getting in the own vehicle and setting the area as the designated parking space, and thereafter getting out of the own vehicle and operating the operation terminal to park the own vehicle in the designated parking space.

SUMMARY

An object of the invention is to provide a remote parking apparatus which can park the own vehicle in the parking space by the remote parking control without imposing bothersome actions to the driver when there is a movable obstacle in the parking space.

According to the invention, a remote parking apparatus comprises an electronic control unit which executes a remote parking control to move an own vehicle and park the own vehicle in a designated parking space in response to receiving a signal transmitted wirelessly from an operation terminal. The electronic control unit is configured to set a parking space as the designated parking space even when there is an obstacle interrupting parking the own vehicle in the parking space.

With the invention, even when there is a movable obstacle in the parking space, a driver of the own vehicle can set the parking space in question as the designated parking space. Thus, when there is a movable obstacle in the parking space which the driver is setting as the designated parking space, the own vehicle can be parked in the designated parking space by the remote parking control without imposing bothersome actions to the driver.

According to an aspect of the invention, the electronic control unit may be configured to execute an informing process to require removing the obstacle from the designated parking space when the electronic control unit sets the parking space in which the obstacle exists as the designated parking space.

With this aspect of the invention, the driver is prompted to remove the obstacle from the designated parking space. Thus, the own vehicle can be parked in the designated parking space by the remote parking control.

According to another aspect of the invention, the informing process may be a process to inform requiring a driver of the own vehicle to remove the obstacle from the designated parking space.

With this aspect of the invention, the driver in the own vehicle is required to remove the obstacle from the designated parking space.

According to further another aspect of the invention, the informing process may be a process to inform requiring a user of the operation terminal to remove the obstacle from the designated parking space.

With this aspect of the invention, the user of the operation terminal is required to remove the obstacle from the designated parking space.

According to further another aspect of the invention, the electronic control unit may be configured to stop executing the remote parking control when the electronic control unit detects the obstacle while the electronic control unit moves the own vehicle by the remote parking control after the electronic control unit sets the parking space in which the obstacle exists as the designated parking space.

With this aspect of the invention, when the obstacle has not been removed from the designated parking space, the remote parking control is stopped. Thus, the own vehicle can be prevented from contacting the obstacle due to executing the remote parking control.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
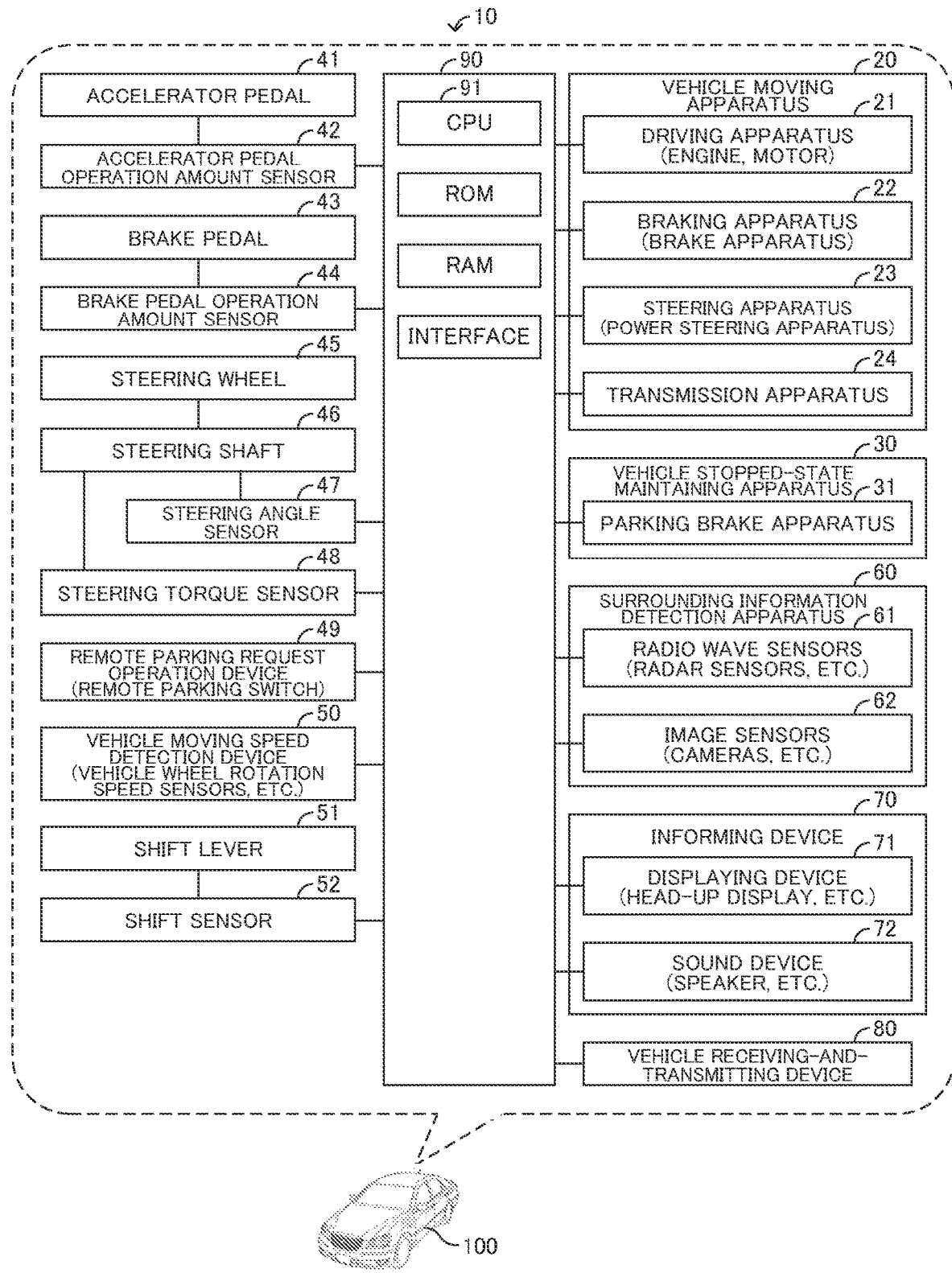
FIG. 1 is a view which shows a remote parking apparatus according to an embodiment of the invention and an own vehicle on which the remote parking apparatus is installed.

Below, a remote parking apparatus according to an embodiment of the invention will be described. As shown in FIG. 1, the remote parking apparatus 10 according to the embodiment of the invention is installed on a vehicle or an own vehicle 100.

The remote parking apparatus 10 is an apparatus which parks the own vehicle 100 in a designated parking space by autonomously moving the own vehicle 100 in response to signals or commands wirelessly transmitted from the outside of the own vehicle 100 and autonomously stopping the own vehicle 100 in the designated parking space.

As shown in FIG. 1, the remote parking apparatus 10 includes a vehicle ECU 90. The vehicle ECU 90 includes a micro-computer as a main component. The vehicle ECU 90 also includes a CPU or a vehicle CPU 91, a ROM, a RAM, a non-volatile memory, and an interface. The vehicle CPU 91 is configured or programmed to realize various functions by executing instructions, programs, or routines memorized in the ROM. In particular, a program to execute a remote parking control is memorized in the vehicle ECU 90.

Figure 2:
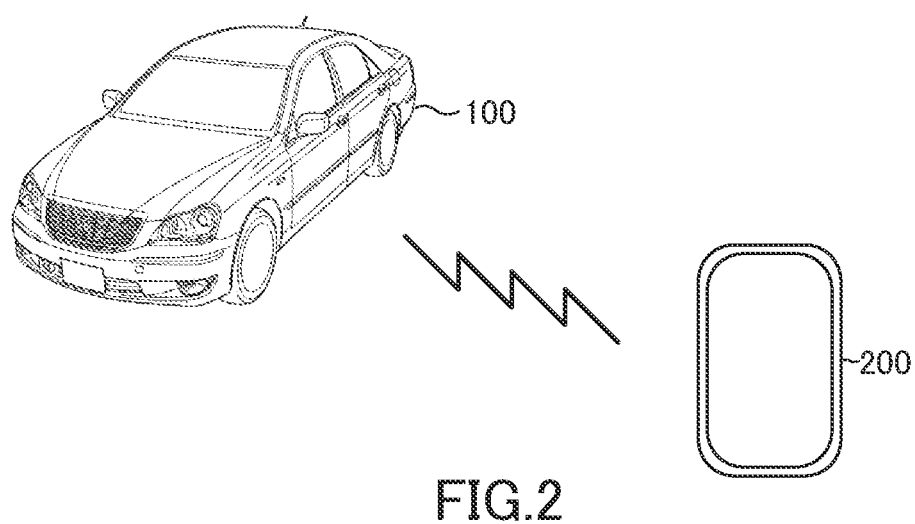
FIG. 2 is a view which shows a scene that the remote parking apparatus according to the embodiment of the invention and an operation terminal according to the embodiment of the invention wirelessly communicate with each other.

In this embodiment, as shown in FIG. 2, the remote parking apparatus 10 receives signals or commands wirelessly transmitted from an operation terminal 200 such as a portable or mobile phone and executes the remote parking control in response to the received commands.

<Vehicle Moving Apparatus>

A vehicle moving apparatus 20 is installed on the own vehicle 100. The vehicle moving apparatus 20 is an apparatus which drives, brakes, and steers the own vehicle 100, and performs a shift change of the own vehicle 100. In this embodiment, the vehicle moving apparatus 20 includes a driving apparatus 21, a braking apparatus 22, a steering apparatus 23, and a transmission apparatus 24.

<Driving Apparatus>

The driving apparatus 21 is an apparatus which outputs a driving force to be applied to the own vehicle 100 to move the own vehicle 100. For example, the driving apparatus 21 includes an internal combustion engine and/or at least one electric motor. The driving apparatus 21 is electrically connected to the vehicle ECU 90. The vehicle ECU 90 can control the driving force output from the driving apparatus 21 by controlling operations of the driving apparatus 21.

<Braking Apparatus>

The braking apparatus 22 is an apparatus which outputs a braking force to be applied to the own vehicle 100 to brake the own vehicle 100. For example, the braking apparatus 22 includes a hydraulic brake apparatus. The braking apparatus 22 is electrically connected to the vehicle ECU 90. The vehicle ECU 90 can control the braking force output from the braking apparatus 22 by controlling operations of the braking apparatus 22.

<Steering Apparatus>

The steering apparatus 23 is an apparatus which outputs a steering force to be applied to the own vehicle 100 to steer the own vehicle 100. For example, the steering apparatus 23 includes a power steering apparatus. The steering apparatus 23 is electrically connected to the vehicle ECU 90. The vehicle ECU 90 can control the steering force output from the steering apparatus 23 by controlling operations of the steering apparatus 23.

<Transmission Apparatus>

The transmission apparatus 24 is an apparatus which changes modes between a mode to transmit the driving force from the driving apparatus 21 to driven wheels of the own vehicle 100 and a mode to shut transmitting the driving force from the driving apparatus 21 to the driven wheels of the own vehicle 100, and changes modes between a mode to transmit the driving force from the driving apparatus 21 to the driven wheels of the own vehicle 100 so as to move the own vehicle 100 forward and a mode to transmit the driving force from the driving apparatus 21 to the driven wheels of the own vehicle 100 so as to move the own vehicle 100 rearward. Also, the transmission apparatus 24 is an apparatus which maintains the own vehicle 100 stopped by locking a gear of the transmission apparatus 24 by engaging a pawl member or a parking lock pawl with the gear to prevent the gear from rotating. Thus, the transmission apparatus 24 functions as a vehicle stopped-state maintaining apparatus which maintains the own vehicle 100 stopped.

The transmission apparatus 24 operates at any one of a drive range state SD, a rear range state SR, a neutral range state SN, and a parking range state SP. The drive range state SD is a state to transmit the driving force to the driven wheels of the own vehicle 100 to move the own vehicle 100 forward. The rear range state SR is a state to transmit the driving force to the driven wheels of the own vehicle 100 to move the own vehicle 100 rearward. The neutral range state SN is a state to shut transmitting the driving force to the driven wheels of the own vehicle 100. The parking range state SP is a state to maintain the own vehicle 100 stopped.

The transmission apparatus 24 is electrically connected to the vehicle ECU 90. The vehicle ECU 90 can set the transmission apparatus 24 at any one of the drive range state SD, the rear range state SR, the neutral range state SN, and the parking range state SP by controlling operations of the transmission apparatus 24.

<Vehicle Stopped-State Maintaining Apparatus>

A vehicle stopped-state maintaining apparatus 30 is installed on the own vehicle 100. The vehicle stopped-state maintaining apparatus 30 is an apparatus which maintains the own vehicle 100 stooped. In this embodiment, the vehicle stopped-state maintaining apparatus 30 is a parking brake apparatus 31. The parking brake apparatus 31 may be an electric parking brake apparatus or a manual parking brake apparatus. The parking brake apparatus 31 is an apparatus which maintains the own vehicle 100 stopped by applying the braking force to the stopped own vehicle 100. In particular, the parking brake apparatus 31 is an apparatus which maintains the own vehicle 100 stopped by applying the braking force to wheels of the stopped own vehicle 100 by pressing brake pads to brake discs provided on the wheels of the own vehicle 100. In this embodiment, the parking brake apparatus 31 is the electric parking brake apparatus. The parking brake apparatus 31 is electrically connected to the vehicle ECU 90. The vehicle ECU 90 can maintain the own vehicle 100 stopped by operating the parking brake apparatus 31.

<Sensors, Etc.>

In addition, an accelerator pedal 41, an accelerator pedal operation amount sensor 42, a brake pedal 43, a brake pedal operation amount sensor 44, a steering wheel 45, a steering shaft 46, a steering angle sensor 47, a steering torque sensor 48, a remote parking request operation device 49, a vehicle moving speed detection device 50, a shift lever 51, a shift sensor 52, a surrounding information detection apparatus 60, an informing device 70, and a vehicle receiving-and-transmitting device 80 are installed on the own vehicle 100.

<Accelerator Pedal Operation Amount Sensor>

The accelerator pedal operation amount sensor 42 is a sensor which detects an operation amount of the accelerator pedal 41. The accelerator pedal operation amount sensor 42 is electrically connected to the vehicle ECU 90. The accelerator pedal operation amount sensor 42 sends information on the detected operation amount of the accelerator pedal 41 to the vehicle ECU 90. The vehicle ECU 90 acquires the operation amount of the accelerator pedal 41 as an accelerator pedal operation amount AP, based on the information sent from the accelerator pedal operation amount sensor 42.

The vehicle ECU 90 calculates and acquires a required driving force or a required driving torque, based on the accelerator pedal operation amount AP and a moving speed of the own vehicle 100 or an own vehicle moving speed when the vehicle ECU 90 does not execute the remote parking control described later in detail. The vehicle ECU 90 controls the operations of the driving apparatus 21 so as to output the driving force corresponding to the required driving force. On the other hand, when the vehicle ECU 90 executes the remote parking control, the vehicle ECU 90 determines a value of the driving force necessary to move the own vehicle 100 in a desired manner by the remote parking control and controls the operations of the driving apparatus 21 so as to output the driving force corresponding to the determined value of the driving force.

<Brake Pedal Operation Amount Sensor>

The brake pedal operation amount sensor 44 is a sensor which detects an operation amount of the brake pedal 43. The brake pedal operation amount sensor 44 is electrically connected to the vehicle ECU 90. The brake pedal operation amount sensor 44 sends information on the detected operation amount of the brake pedal 43 to the vehicle ECU 90. The vehicle ECU 90 acquires the operation amount of the brake pedal 43 as a brake pedal operation amount BP, based on the information sent from the brake pedal operation amount sensor 44.

The vehicle ECU 90 calculates and acquires a required braking force or a required braking torque, based on the brake pedal operation amount BP when the vehicle ECU 90 does not execute the remote parking control described later in detail. The vehicle ECU 90 controls the operations of the braking apparatus 22 so as to output the braking force corresponding to the required braking force. On the other hand, when the vehicle ECU 90 executes the remote parking control, the vehicle ECU 90 determines a value of the braking force necessary to brake the own vehicle 100 in a desired manner by the remote parking control and controls the operations of the braking apparatus 22 so as to output the braking force corresponding to the determined value of the braking force.

<Steering Angle Sensor>

The steering angle sensor 47 is a sensor which detects a rotation angle of the steering shaft 46 with respect to a neutral position of the steering shaft 46. The steering angle sensor 47 is electrically connected to the vehicle ECU 90. The steering angle sensor 47 sends information on the detected rotation angle of the steering shaft 46 to the vehicle ECU 90. The vehicle ECU 90 acquires the rotation angle of the steering shaft 46 as a steering angle θ, based on the information sent from the steering angle sensor 47.

<Steering Torque Sensor>

The steering torque sensor 48 is a sensor which detects a torque which a driver DR of the own vehicle 100 inputs to the steering shaft 46 via the steering wheel 45. The steering torque sensor 48 is electrically connected to the vehicle ECU 90. The steering torque sensor 48 sends information on the detected torque to the vehicle ECU 90. The vehicle ECU 90 acquires the torque which the driver DR inputs to the steering shaft 46 via the steering wheel 45 as a driver input torque, based on the information sent from the steering torque sensor 48.

The vehicle ECU 90 acquires a required steering force or a required steering torque, based on the steering angle θ, the driver input torque and the moving speed of the own vehicle 100 or the own vehicle moving speed when the vehicle ECU 90 does not execute the remote parking control described later in detail. The vehicle ECU 90 controls the operations of the steering apparatus 23 so as to output the steering force corresponding to the required steering force. On the other hand, when the vehicle ECU 90 executes the remote parking control, the vehicle ECU 90 determines a value of the steering force necessary to move the own vehicle 100 in a desired manner by the remote parking control and controls the operations of the steering apparatus 23 so as to output the steering force corresponding to the determined value of the steering force.

<Remote Parking Request Operation Device>

The remote parking request operation device 49 is a device which the driver DR operates to request the vehicle ECU 90 to execute the remote parking control described later in detail. The remote parking request operation device 49 is, for example, a switch. The remote parking request operation device 49 is electrically connected to the vehicle ECU 90. When the remote parking request operation device 49 is operated by the driver DR, the remote parking request operation device 49 sends a predetermined signal to the vehicle ECU 90. When the vehicle ECU 90 receives the predetermined signal from the remote parking request operation device 49, the vehicle ECU 90 determines that the remote parking control is requested to be executed.

<Vehicle Moving Speed Detection Device>

The vehicle moving speed detection device 50 is a device which detects the moving speed of the own vehicle 100. The vehicle moving speed detection device 50 includes, for example, vehicle wheel rotation speed sensors. The vehicle moving speed detection device 50 is electrically connected to the vehicle ECU 90. The vehicle moving speed detection device 50 sends information on the detected moving speed of the own vehicle 100 to the vehicle ECU 90. The vehicle ECU 90 acquires the moving speed of the own vehicle 100 as an own vehicle moving speed V, based on the information sent from the vehicle moving speed detection device 50.

<Shift Sensor>

The shift sensor 52 is a sensor which detects a set position of the shift lever 51. The shift lever 51 is a device which the driver DR of the own vehicle 100 operates. The set positions of the shift lever 51 which the driver DR can set are a forward position or a drive range D, a rearward position or a rear range R, a neutral position or a neutral range N, and a parking position or a parking range P. The shift sensor 52 is electrically connected to the vehicle ECU 90. The shift sensor 52 sends information on the detected set position of the shift lever 51 to the vehicle ECU 90.

When the shift lever 51 is set at the drive range D, the shift sensor 52 sends a signal which shows that the set position of the shift lever 51 is the drive range D to the vehicle ECU 90. When the vehicle ECU 90 receives the signal which shows that the set position of the shift lever 51 is the drive range D, the vehicle ECU 90 controls the operations of the transmission apparatus 24 so as to set the transmission apparatus 24 at the drive range state SD.

Further, when the shift lever 51 is set at the rear range R, the shift sensor 52 sends a signal which shows that the set position of the shift lever 51 is the rear range R to the vehicle ECU 90. When the vehicle ECU 90 receives the signal which shows that the set position of the shift lever 51 is the rear range R, the vehicle ECU 90 controls the operations of the transmission apparatus 24 so as to set the transmission apparatus 24 at the rear range state SR.

Furthermore, when the shift lever 51 is set at the neutral range N, the shift sensor 52 sends a signal which shows that the set position of the shift lever 51 is the neutral range N to the vehicle ECU 90. When the vehicle ECU 90 receives the signal which shows that the set position of the shift lever 51 is the neutral range N, the vehicle ECU 90 controls the operations of the transmission apparatus 24 so as to set the transmission apparatus 24 at the neutral range state SN.

Furthermore, when the shift lever 51 is set at the parking range P, the shift sensor 52 sends a signal which shows that the set position of the shift lever 51 is the parking range P to the vehicle ECU 90. When the vehicle ECU 90 receives the signal which shows that the set position of the shift lever 51 is the parking range P, the vehicle ECU 90 controls the operations of the transmission apparatus 24 so as to set the transmission apparatus 24 at the parking range state SP.

It should be noted that when the vehicle ECU 90 executes the remote parking control described later in detail, the vehicle ECU 90 controls the operations of the transmission apparatus 24, depending on necessity to move the own vehicle 100 in a desired manner by the remote parking control. That is, the vehicle ECU 90 performs a shift change, depending on the necessity to move the own vehicle 100 in a desired manner by the remote parking control.

<Surrounding Information Detection Apparatus>

The surrounding information detection apparatus 60 is an apparatus which detects information on surroundings of the own vehicle 100. In this embodiment, the surrounding information detection apparatus 60 includes radio wave sensors 61 and image sensors 62.

<Radio Wave Sensors>

The radio wave sensor 61 is a sensor which detects information on objects around the own vehicle 100, using radio waves. For example, the radio wave sensor 61 is a radar sensor such as a millimeter wave radar, a sound wave sensor such as an ultrasonic wave sensor such as a clearance sonar, and an optical sensor such as a laser radar such as a LiDAR. The radio wave sensor 61 is electrically connected to the vehicle ECU 90. The radio wave sensor 61 transmits the radio waves and receives the radio waves reflected on the objects, i.e., receives reflected waves. The radio wave sensor 61 sends information on the transmitted radio waves and the received radio waves, i.e., the received reflected waves to the vehicle ECU 90. In other words, the radio wave sensor 61 detects the objects around the own vehicle 100 and sends information on the detected objects to the vehicle ECU 90. The vehicle ECU 90 can acquire information or surrounding detection information IS on the objects around the own vehicle 100, based on the information sent from the radio wave sensors 61, i.e., based on radio wave information IR or radio wave data. The objects detected using the radio wave sensors 61 are, for example, vehicles, walls, bicycles, and persons.

<Image Sensors>

The image sensor 62 is a sensor which takes images of a view around the own vehicle 100. The image sensor 62 is, for example, a camera. The image sensor 62 is electrically connected to the vehicle ECU 90. The image sensor 62 takes images of the view around the own vehicle 100 and sends information on the taken images to the vehicle ECU 90. The vehicle ECU 90 can acquire information on a situation around the own vehicle 100, i.e., surrounding detection information IS, based on the information sent from the image sensors 62, i.e., based on image information IC or image data.

<Informing Device>

The informing device 70 is installed on the own vehicle 100. The informing device 70 is a device which informs the driver DR of various information. In this embodiment, the informing device 70 includes a displaying device 71 and a sound device 72.

<Displaying Device>

The displaying device 71 is a device which displays images. In this embodiment, the displaying device 71 is a display such as a human machine interface (HMI). The displaying device 71 is provided such that the driver DR in the own vehicle 100 can see the images displayed on the displaying device 71.

In this embodiment, the displaying device 71 has property that specific physical property changes due to touch interaction applied to the displaying device 71 by objects. In particular, in this embodiment, the displaying device 71 has property that specific physical property changes due to touch interaction applied to the displaying device 71 by a finger of a person.

The displaying device 71 is electrically connected to the vehicle ECU 90. The vehicle ECU 90 can display various images on the displaying device 71. Further, the vehicle ECU 90 can detect change of the specific physical property of the displaying device 71 due to touch interaction applied to the displaying device 71 by objects and determine a portion of the displaying device 71 which the objects touch, based on the detected change.

<Sound Device>

The sound device 72 is a device which outputs sounds. The sound device 72 is, for example, a speaker. The sound device 72 is provided such that the driver DR in the own vehicle 100 can hear the sounds output from the sound device 72. The sound device 72 is electrically connected to the vehicle ECU 90. The vehicle ECU 90 can output various sounds such as announcements from the sound device 72.

<Vehicle Receiving-and-Transmitting Device>

The vehicle receiving-and-transmitting device 80 is a device which receives signals wirelessly coming from the outside of the own vehicle 100 and wirelessly transmits signals to the outside of the own vehicle 100. The vehicle receiving-and-transmitting device 80 is electrically connected to the vehicle ECU 90. The vehicle ECU 90 can wirelessly transmit various signals to the outside of the own vehicle 100 via the vehicle receiving-and-transmitting device 80. Further, the vehicle ECU 90 can receive various signals which a terminal ECU 290 described later in detail wirelessly transmits to the outside of an operation terminal 200 via a terminal receiving-and-transmitting device 280, using the vehicle receiving-and-transmitting device 80.

<Operation Terminal>

In this embodiment, the operation terminal 200 is a so-called smart phone which a person can carry. The operation terminal 200 may be any of terminals with which a user such as the driver DR gets out of the own vehicle 100. For example, the operation terminal 200 may be a so-called smart key which a person can carry or a dedicated terminal for remote parking.

Figure 3:
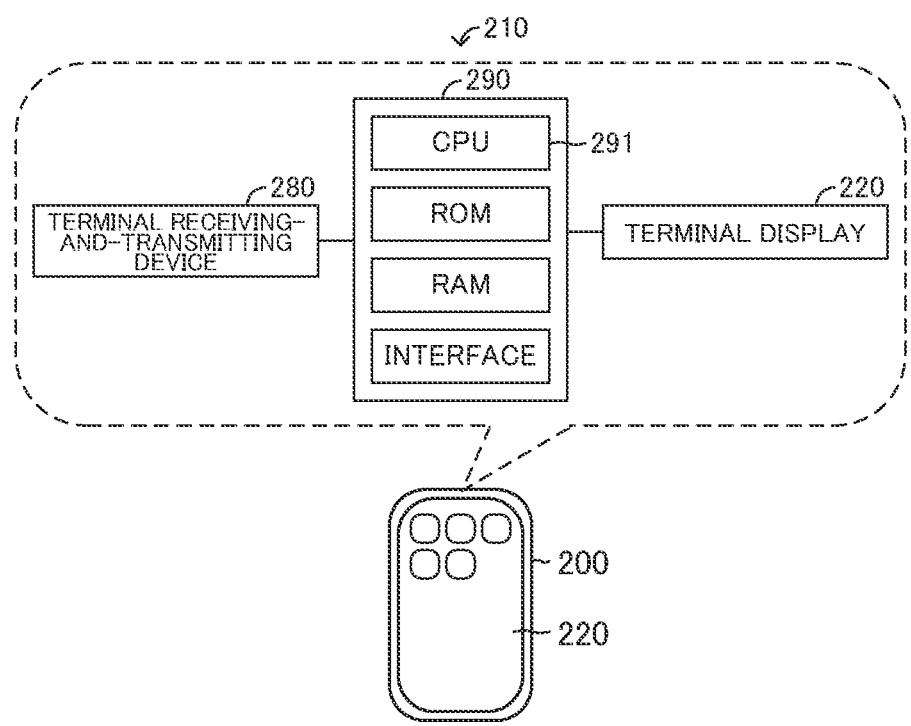
FIG. 3 is a view which shows a terminal control unit according to the embodiment of the invention and the operation terminal on which the terminal control unit is installed.

As shown in FIG. 3, a terminal control unit 210 is installed in the operation terminal 200. The terminal control unit 210 includes a terminal ECU 290.

ECU stands for electronic control unit. The terminal ECU 290 includes a micro-computer as a main component. The terminal ECU 290 includes a CPU or a terminal CPU 291, a ROM, a RAM, a non-volatile memory, and an interface. The terminal CPU 291 is configured or programmed to realize various functions by executing instructions, programs, or routines memorized in the ROM. In particular, a remote parking application or a remote parking application software for causing the vehicle ECU 90 of the own vehicle 100 to execute the remote parking control described later in detail is installed in the terminal ECU 290.

Further, the operation terminal 200 includes a terminal display 220 and a terminal receiving-and-transmitting device 280.

The terminal display 220 is a device which displays images. Further, the terminal display 220 has property that specific property changes due to touch interaction applied to the terminal display 220 by objects. In particular, in this embodiment, the terminal display 220 has property that specific physical property changes due to touch interaction applied to the displaying device 71 by a finger of a person.

The terminal display 220 is electrically connected to the terminal ECU 290. The terminal ECU 290 can display various images on the terminal display 220. Further, the terminal ECU 290 can detect change of the specific physical property of the terminal display 220 due to touch interaction applied to the terminal display 220 by objects and determine a portion of the terminal display 220 which the objects touch, based on the detected change.

The terminal receiving-and-transmitting device 280 is a device which receives signals wirelessly coming from the outside of the operation terminal 200 and wirelessly transmits signals to the outside of the operation terminal 200. The terminal receiving-and-transmitting device 280 is electrically connected to the terminal ECU 290. The terminal ECU 290 can wirelessly transmit various signals to the outside of the operation terminal 200 via the terminal receiving-and-transmitting device 280. Further, the terminal ECU 290 can receive various signals which the vehicle ECU 90 of the own vehicle 100 wirelessly transmits to the outside of the own vehicle 100 via the vehicle receiving-and-transmitting device 80, using the terminal receiving-and-transmitting device 280.

<Summary of Operations of Remote Parking Apparatus>

Next, summary of operations of the remote parking apparatus 10 will be described. As described above, the remote parking apparatus 10 is configured to execute the remote parking control. Below, the remote parking control will be described.

When the remote parking apparatus 10 determines that the remote parking control is requested to be executed in response to an operation applied to the remote parking request operation device 49, the remote parking apparatus 10 executes a parking space detecting process. The parking space detecting process is a process to detect a parking space where the own vehicle 100 can be parked, based on the surrounding detection information IS. Below, the parking space where the own vehicle 100 can be parked will be referred to as "available parking space 305C."

In particular, the parking space detecting process is a process to execute an object detection process to detect space defining objects 300, based on the surrounding detection information IS, determine a parking space 305 defined by the space defining objects 300, and detect the parking space 305 where no vehicle parks as the available parking space 305C. The space defining object 300 is an object which defines a parking space. In particular, the space defining object 300 may include markings 301 provided on the ground around the own vehicle 100 or walls 302 around the own vehicle 100.

Figure 4:
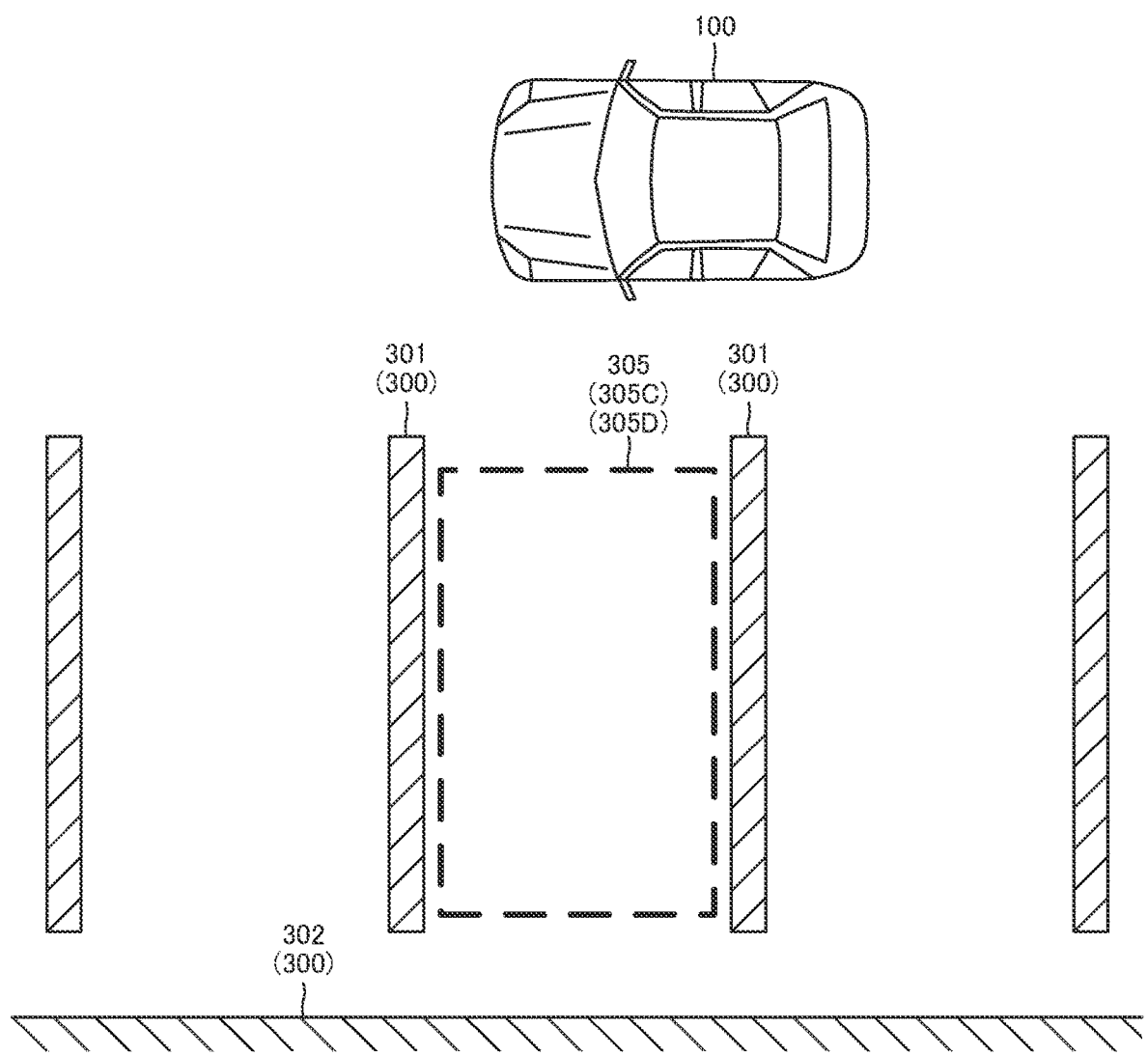
FIG. 4 is a view which shows a scene that the own vehicle stops near a parking space.

For example, as shown in FIG. 4, when there is a parking space 305 at the left side of the own vehicle 100, and no vehicle is in the parking space 305 in question, the remote parking apparatus 10 detects the parking space 305 in question as the available parking space 305C. Similarly, when there is a parking space 305 at the right side of the own vehicle 100, and no vehicle is in the parking space 305 in question, the remote parking apparatus 10 detects the parking space 305 in question as the available parking space 305C.

It should be noted that when there are parking spaces side by side at the left side of the own vehicle 100, and no vehicles are in the parking spaces in question, the remote parking apparatus 10 may detect the parking spaces in question as the available parking spaces 305C. However, in this embodiment, the remote parking apparatus 10 detects the parking space at the direct or generally direct left side of the own vehicle 100 as the available parking space 305C among the parking spaces at the left side of the own vehicle 100. Similarly, when there are parking spaces side by side at the right side of the own vehicle 100, and no vehicles are in the parking spaces in question, the remote parking apparatus 10 may detect the parking spaces in question as the available parking spaces 305C. However, in this embodiment, the remote parking apparatus 10 detects the parking space at the direct or generally direct right side of the own vehicle 100 as the available parking space 305C among the parking spaces at the right side of the own vehicle 100. As described above, the remote parking apparatus 10 detects the parking space at the direct or generally direct left side of the own vehicle 100 as the available parking space 305C among the parking spaces at the left side of the own vehicle 100 and the parking space at the direct or generally direct right side of the own vehicle 100 as the available parking space 305C among the parking spaces at the right side of the own vehicle 100.

The remote parking apparatus 10 displays an available parking space image on the displaying device 71. The available parking space image is an image which shows the detected available parking space 305C. The driver DR can designate the available parking space 305C to park the own vehicle 100 by carrying out a parking space designating operation. In this embodiment, the parking space designating operation is a touch interaction applied to an available parking space image portion of the displaying device 71 which displays the available parking space image. The touch interaction applied to the displaying device 71, in particular, to a portion of the displaying device 71 is an operation carried out by a person to touch the displaying device 71 with their finger.

When the remote parking apparatus 10 detects the parking space designating operation, the remote parking apparatus 10 sets the available parking space 305C which the driver DR designates as a designated parking space 305D.

Figure 5:
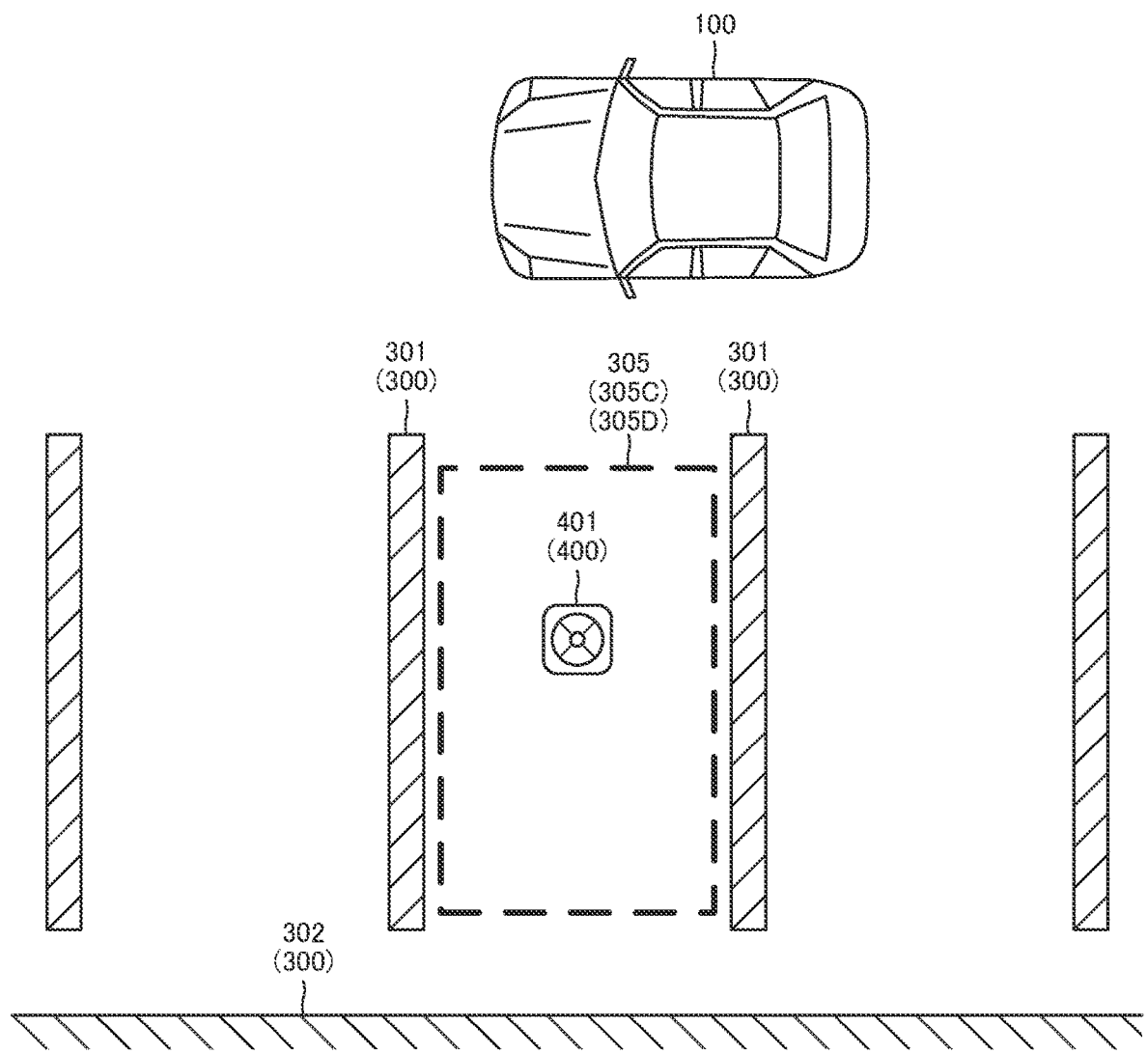
FIG. 5 is a view which shows a scene that a pylon is placed in the parking space.
Figure 6:
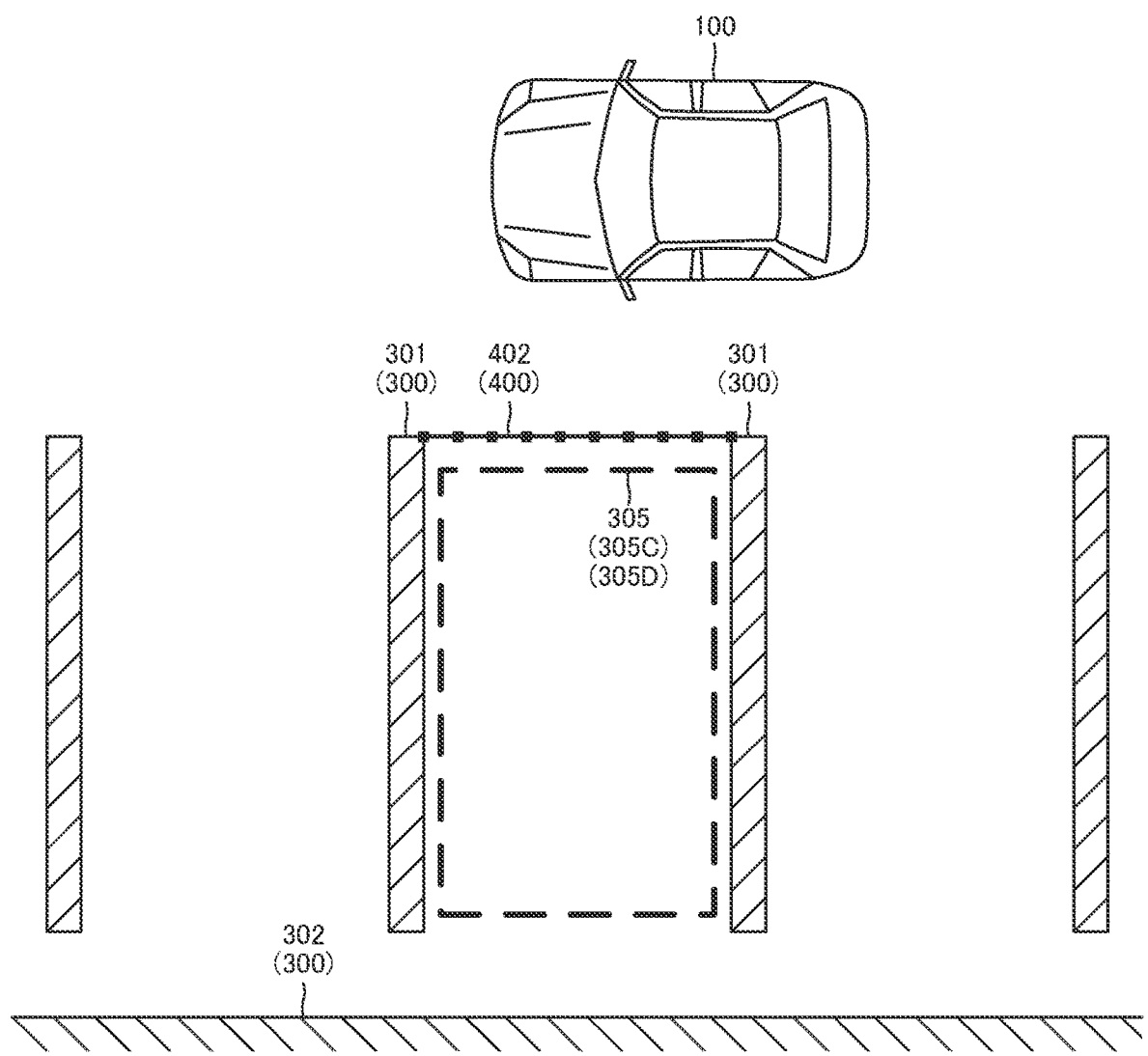
FIG. 6 is a view which shows a scene that the parking space is closed by a retractable gate fence.

When the remote parking apparatus 10 sets the designated parking space 305D, the remote parking apparatus 10 executes an obstacle detecting process. The obstacle detecting process is a process to detect movable objects which interrupt parking the own vehicle 100 in the designated parking space 305D, based on the surrounding detection information IS. Below, the movable object which interrupts parking the own vehicle 100 in the designated parking space 305D will be referred to as "movable obstacle 400." The movable obstacle 400 may be a pylon 401 placed in the available parking space 305C as shown in FIG. 5 or a retractable gate fence 402 or shutter which closes the available parking space 305C as shown in FIG. 6.

In this embodiment, the obstacle detecting process is a process to detect the movable obstacle 400 in the designated parking space 305D, using so-called triangulation technique based on the image information IC. In this regard, the obstacle detecting process may be a process to detect the movable obstacle 400 in the designated parking space 305D, based on the radio wave information IR. The own vehicle 100 moves until it stops near an entrance of the designated parking space 305D. Thus, disparity is produced between images of the designated parking space 305D taken by the image sensor 62. Thus, the movable obstacle 400 in the designated parking space 305D can be detected by the triangulation technique using the disparity. The obstacle detecting process of this embodiment is a process to detect the movable obstacles 400 in the designated parking space 305D by the triangulation technique using the disparity produced between the images.

It should be noted that the obstacle detecting process may be a process which includes three processes such as (i) a process to detect the movable obstacles 400 in the designated parking space 305D, using the triangulation technique, based on the image information IC, (ii) a process to detect the movable obstacles 400 in the designated parking space 305D, based on the radio wave information IR, and (iii) a process to detect the movable obstacles 400 in the designated parking space 305D as detection results of the processes (i) and (ii).

When there is no movable obstacle 400 in the designated parking space 305D as shown in FIG. 4, no movable obstacle 400 is detected by the obstacle detecting process. Thus, the remote parking apparatus 10 determines that there is no movable obstacle 400.

Figure 7:
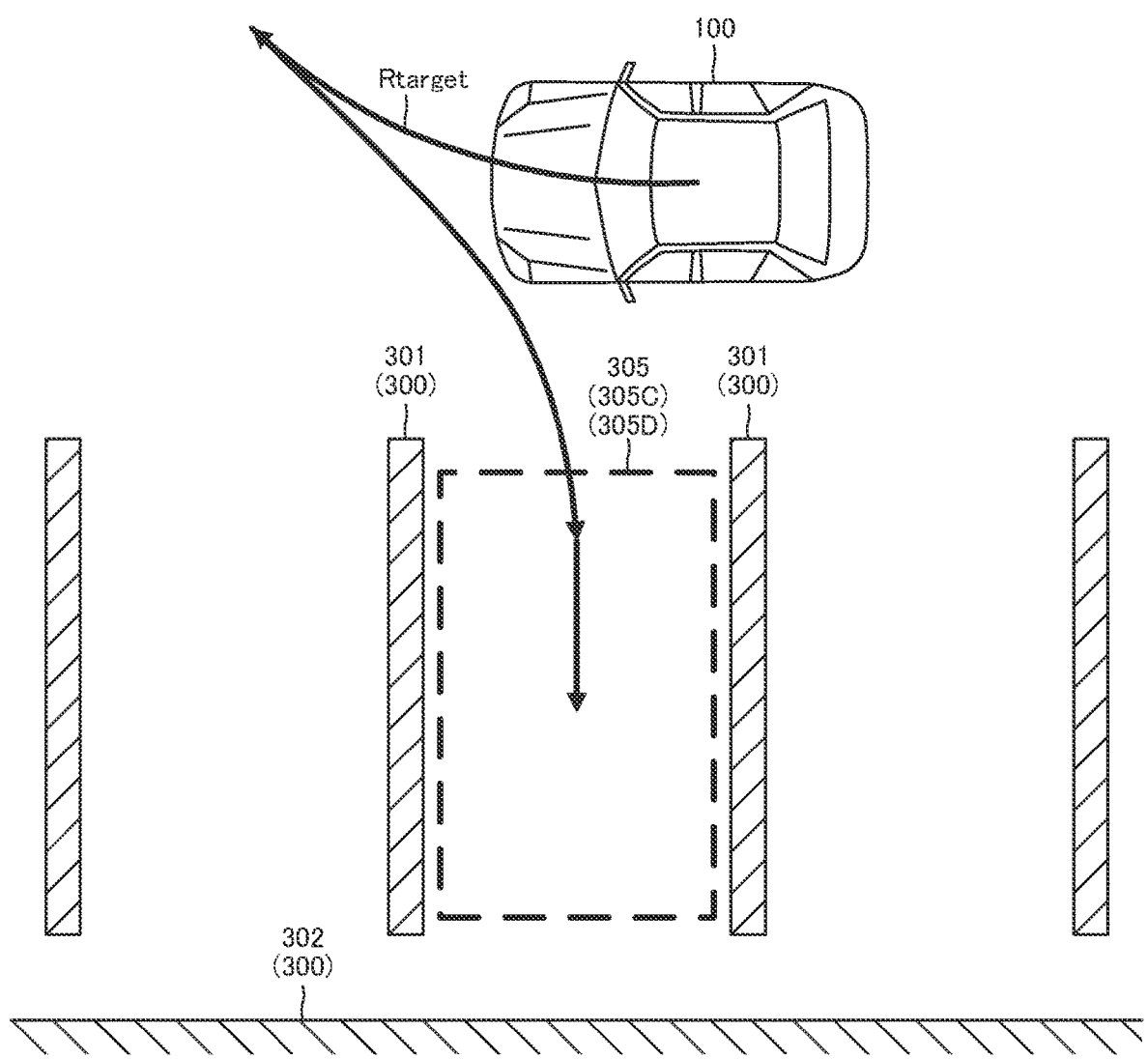
FIG. 7 is a view which shows a target moving route set by a remote parking control.

When the remote parking apparatus 10 determines that there is no movable obstacle 400, the remote parking apparatus 10 executes a moving route setting process. The moving route setting process is a process to set a moving route of the own vehicle 100 used to park it in the designated parking space 305D as a target moving route Rtarget as shown in FIG. 7.

On the other hand, when there is a movable obstacle 400 in the designated parking space 305D, i.e., a movable obstacle 400 exists in the designated parking space 305D as shown in FIG. 5 and FIG. 6, the movable obstacle 400 is detected by the obstacle detecting process. Thus, the remote parking apparatus 10 determines that there is a movable obstacle 400 in the designated parking space 305D.

When the remote parking apparatus 10 determines that there is a movable obstacle 400 in the designated parking space 305D, the remote parking apparatus 10 executes the removing requirement informing process and wirelessly transmits a removing requirement signal Sremove_req to the outside of the own vehicle 100. Then, the remote parking apparatus 10 executes the moving route setting process. The removing requirement informing process is a process to require the driver DR to remove the movable obstacle 400 from the designated parking space 305D to a place where the movable obstacle 400 does not interrupt parking the own vehicle 100.

In particular, the removing requirement informing process is a process which includes one or both of a process to display a removing requirement image on the displaying device 71 and a process to output an obstacle removing requirement announcement from the sound device 72. The removing requirement image is an image which shows characters or diagrams to require the driver DR to remove the movable obstacle 400 from the designated parking space 305D to a place where the movable obstacle 400 does not interrupt parking the own vehicle 100. Further, the obstacle removing requirement announcement is an announcement which requires the driver DR to remove the movable obstacle 400 from the designated parking space 305D to a place where the movable obstacle 400 does not interrupt parking the own vehicle 100.

Further, the removing requirement signal Sremove_req is a signal which requires the terminal control unit 210 to execute a removing requirement informing process. The removing requirement informing process which the terminal control unit 210 is required to execute, is a process to display an image or a removing requirement image which shows characters or diagrams to require a user of the operation terminal 200 or a terminal user UR to remove the movable obstacle 400 from the designated parking space 305D to a place where the movable obstacle 400 does not interrupt parking the own vehicle 100.

When the driver DR gets out of the own vehicle 100 and applies an application starting operation to the terminal display 220 of the operation terminal 200, the terminal control unit 210 starts a remote parking application in response to the application starting operation and display a predetermined image on the terminal display 220. The application starting operation is a touch interaction applied to the terminal display 220 to start the remote parking application. In this embodiment, the touch interaction applied to the terminal display 220 is an operation or a touch operation that a person touches the terminal display 220 with their finger.

When the terminal control unit 210 starts the remote parking application, the terminal control unit 210 wirelessly transmits an application start signal Sapp_start to the outside of the terminal control unit 210. The application start signal Sapp_start is a signal which represents information such as an ID used to determine whether the operation terminal 200 is a registered operation terminal, i.e., identify the operation terminal 200. The registered operation terminal is an operation terminal which is registered by the remote parking apparatus 10 as an operation terminal used to cause the remote parking apparatus 10 to execute the remote parking control.

In addition, when the terminal control unit 210 starts the remote parking application, but does not receive the removing requirement signal Sremove_req, the terminal control unit 210 displays a moving operation image on the terminal display 220. The moving operation image is an image which defines a moving operation portion of the terminal display 220 which accepts the touch interaction or a moving operation to wirelessly transmit a moving permission signal Spermit to the outside of the operation terminal 200. The moving permission signal Spermit is a signal which provides the remote parking apparatus 10 with permission to move the own vehicle 100.

On the other hand, when the terminal control unit 210 starts the remote parking application and receives the removing requirement signal Sremove_req, the terminal control unit 210 displays the removing requirement image on the terminal display 220. In addition, the terminal control unit 210 displays a removing complete reporting operation image on the terminal display 220. As described above, the removing requirement image is an image which shows characters or diagrams to require the terminal user UR to remove the movable obstacle 400 from the designated parking space 305D to a place where the movable obstacle 400 does not interrupt parking the own vehicle 100. That is, the removing requirement image is an image which shows characters or diagrams to require the terminal user UR to take an action of removing the movable obstacle 400. The removing complete reporting operation image is an image which defines a removing complete reporting operation portion of the terminal display 220 which accepts the touch interaction or a removing complete reporting operation to wirelessly transmit a removing complete report signal Sreport to the outside of the operation terminal 200.

Figure 8:
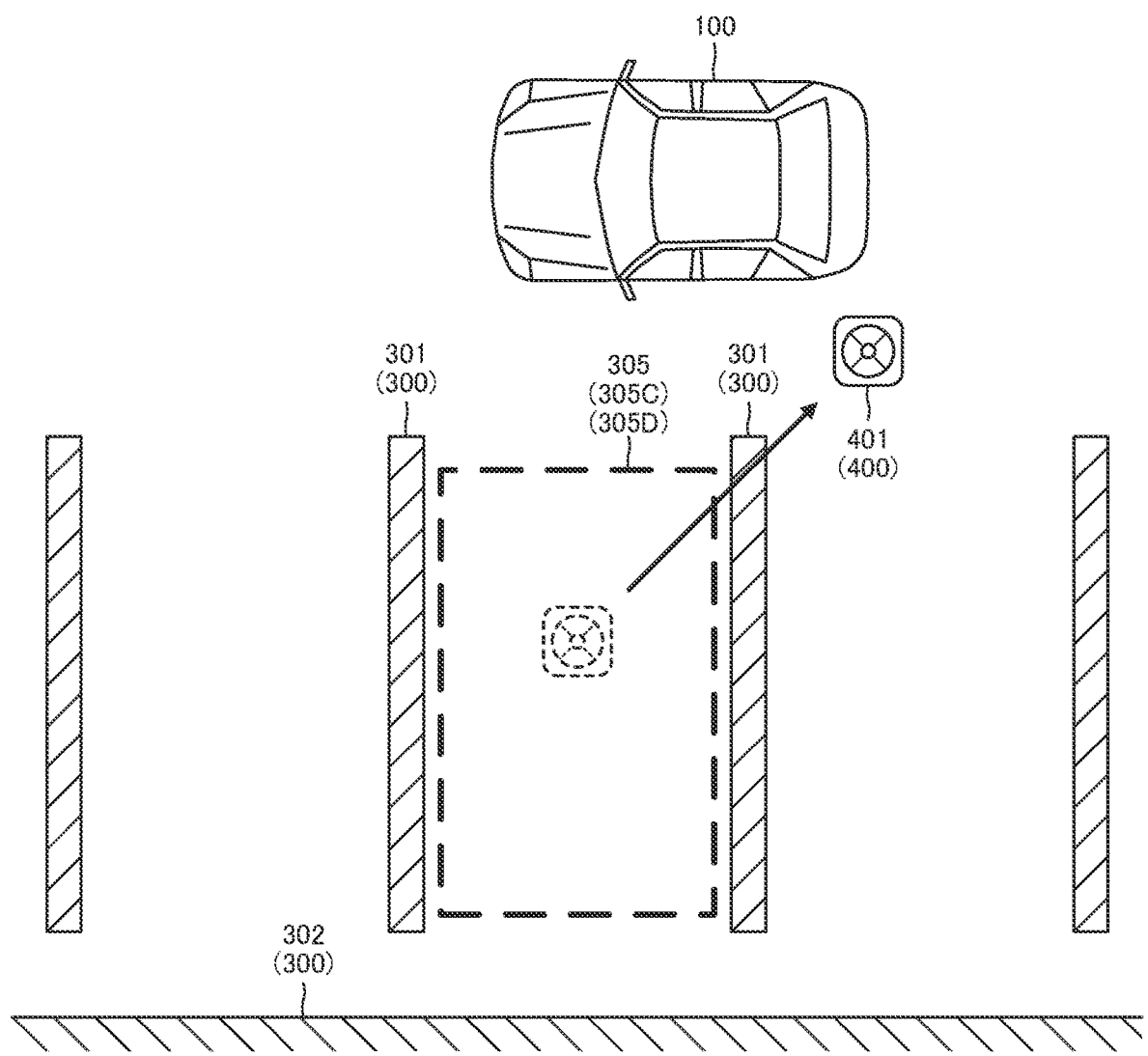
FIG. 8 is a view which shows a scene that the pylon is removed from the parking space.
Figure 9:
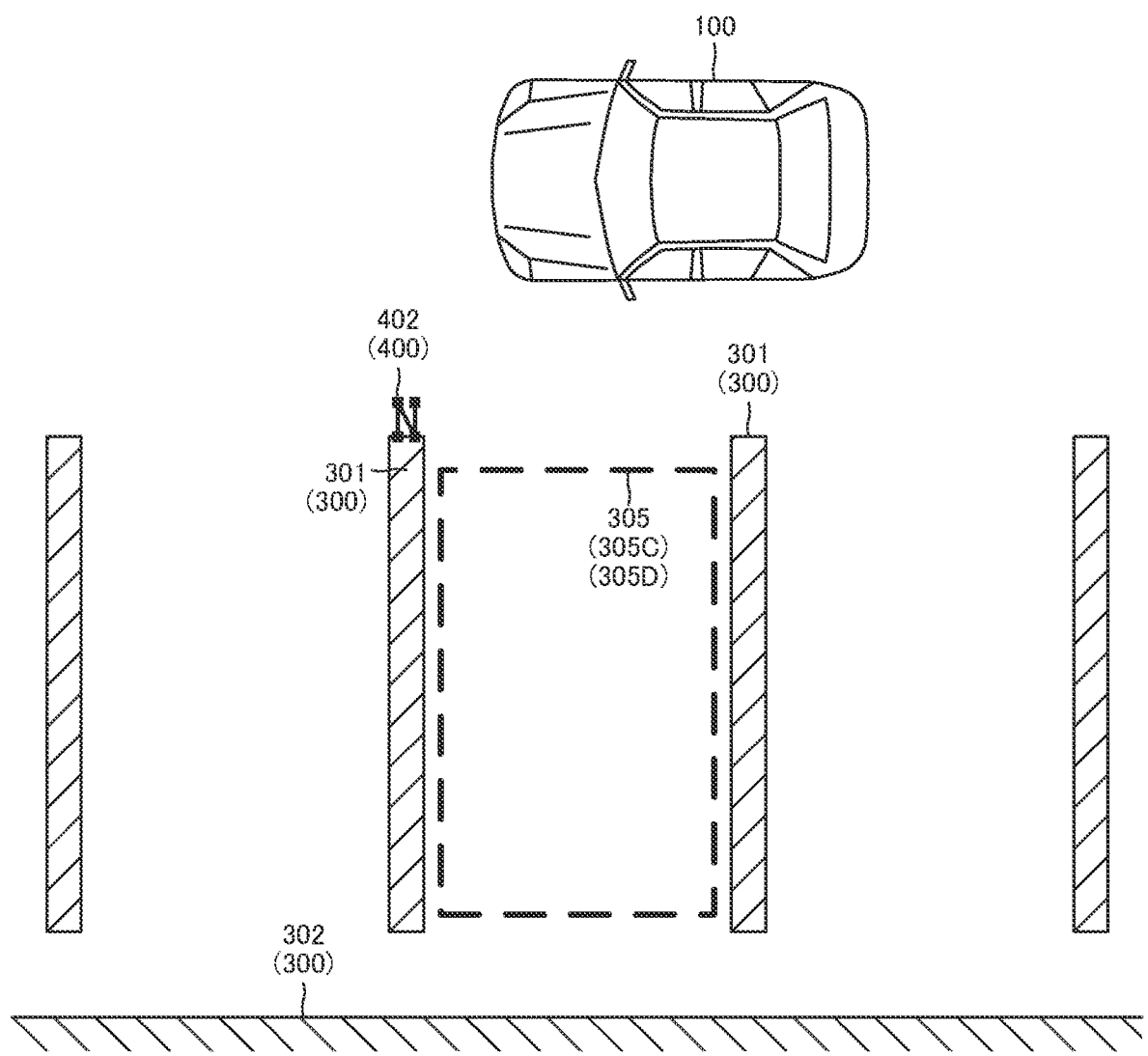
FIG. 9 is a view which shows a scene that the retractable gate fence closing the parking space is retracted.

When the terminal user UR removes the movable obstacle 400 from the designated parking space 305D in accordance with a requirement provided by the removing requirement image by moving the movable obstacle 400 such as a pylon 401 to the outside of the designated parking space 305D as shown in FIG. 8 or retracting the movable obstacle 400 such as a retractable gate fence 402 as shown in FIG. 9, and carries out the removing complete reporting operation, the terminal control unit 210 wirelessly transmits the removing complete report signal Sreport to the outside of the terminal control unit 210 in response to the removing complete reporting operation, stops displaying the removing requirement image and the moving complete reporting operation image on the terminal display 220, and displays the moving operation image on the terminal display 220.

When the remote parking apparatus 10 receives the application start signal Sapp_start, the remote parking apparatus 10 executes a terminal identifying process to determine whether the operation terminal 200 shown by information such as an ID represented by the application start signal Sapp_start is a registered operation terminal.

In this embodiment, the operation terminal 200 is the registered operation terminal. Thus, the remote parking apparatus 10 determines that the operation terminal 200 is the registered operation terminal by the terminal identifying process.

When the remote parking apparatus 10 does not wirelessly transmit the removing requirement signal Sremove_req to the outside of the remote parking apparatus 10 and determines that the operation terminal 200 is the registered operation terminal, the remote parking apparatus 10 starts a parking moving process.

On the other hand, when the remote parking apparatus 10 wirelessly transmits the removing requirement signal Sremove_req to the outside of the remote parking apparatus 10 and determines that the operation terminal 200 is the registered operation terminal, the remote parking apparatus 10 determines whether to receive the removing complete report signal Sreport. When the remote parking apparatus 10 has received the removing complete report signal Sreport, the remote parking apparatus 10 starts the parking moving process.

When the remote parking apparatus 10 starts the parking moving process, the remote parking apparatus 10 moves the own vehicle 100 along the target moving route Rtarget by controlling the operations of the vehicle moving apparatus 20 in response to receiving the moving permission signal Spermit from the terminal control unit 210.

As described above, the terminal control unit 210 wirelessly transmits the moving permission signal Spermit to the outside of the terminal control unit 210 while the moving operations are carried out. Thus, when the moving operation is not carried out, the terminal control unit 210 stops wirelessly transmitting the moving permission signal Spermit to the outside of the terminal control unit 210. In this case, the remote parking apparatus 10 does not receive the moving permission signal Spermit. When the remote parking apparatus 10 does not receive the moving permission signal Spermit, the remote parking apparatus 10 stops the own vehicle 100 by executing a vehicle stopping process. The vehicle stopping process is a process to stop the own vehicle 100 by controlling the operations of the braking apparatus 22.

Further, when the own vehicle 100 starts being moved forward or rearward by the parking moving process, the remote parking apparatus 10 executes a removing confirming process. In this embodiment, the removing confirming process is a process to detect the movable obstacle 400 in the designated parking space 305D by the triangulation technique based on the image information IC. In this regard, the removing confirming process may be a process to detect the movable obstacle 400 in the designated parking space 305D, based on the radio wave information IR. When the own vehicle 100 is moved forward or rearward, disparity is produced between the images of the designated parking space 305D taken by the image sensor 62. Thus, the movable obstacle 400 in the designated parking space 305D can be detected by the triangulation technique using the disparity. The removing confirming process of this embodiment is a process to detect the movable obstacle 400 in the designated parking space 305D by the triangulation technique using the disparity produced between the images.

It should be noted that the removing confirming process may be a process which includes three processes such as (i) a process to detect the movable obstacles 400 in the designated parking space 305D, using the triangulation technique, based on the image information IC, (ii) a process to detect the movable obstacles 400 in the designated parking space 305D, based on the radio wave information IR, and (iii) a process to detect the movable obstacles 400 in the designated parking space 305D as detection results of the processes (i) and (ii).

Figure 10:
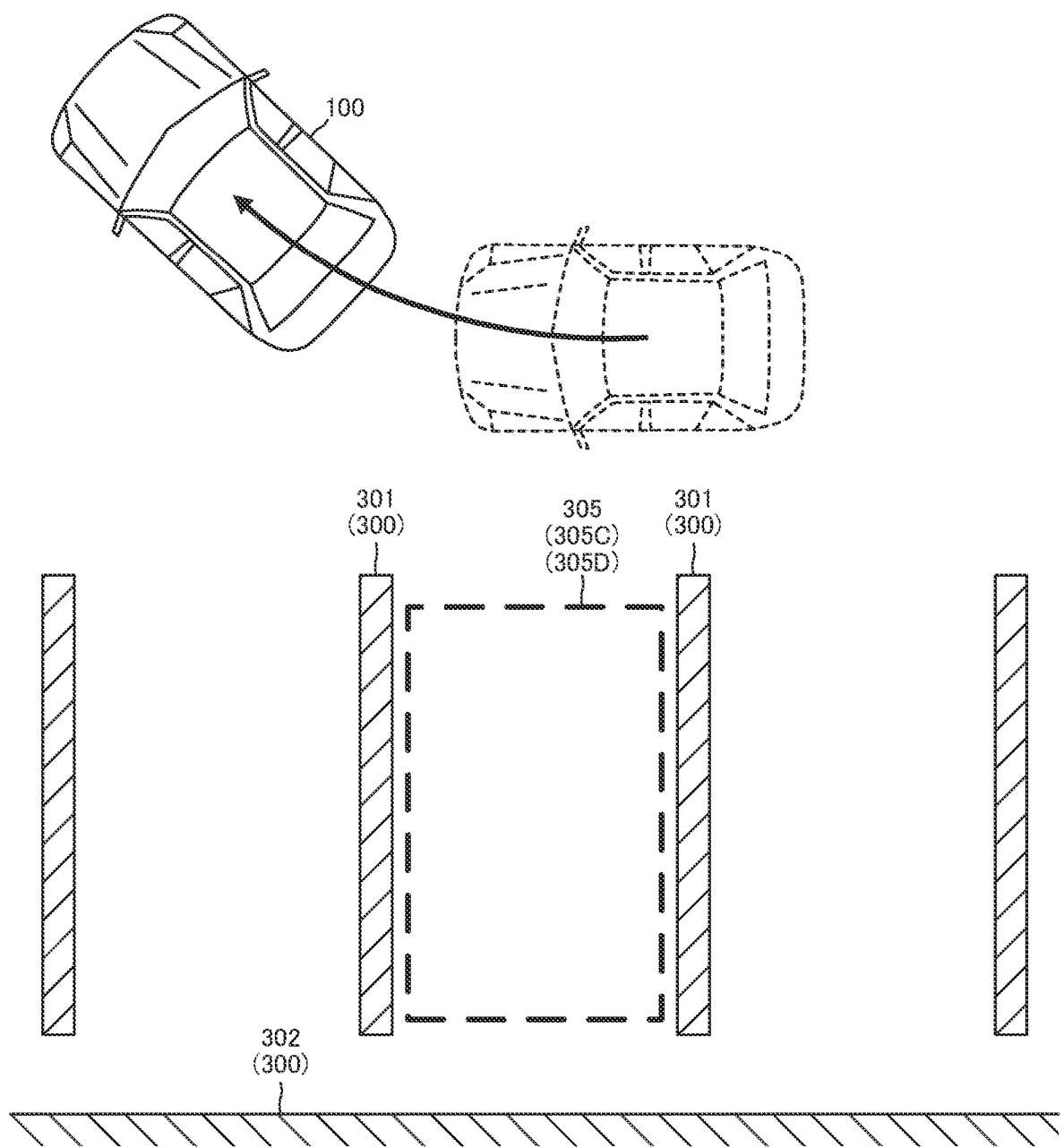
FIG. 10 is a view which shows a scene that the own vehicle is moved forward while being turned right by the remote parking control.
Figure 11:
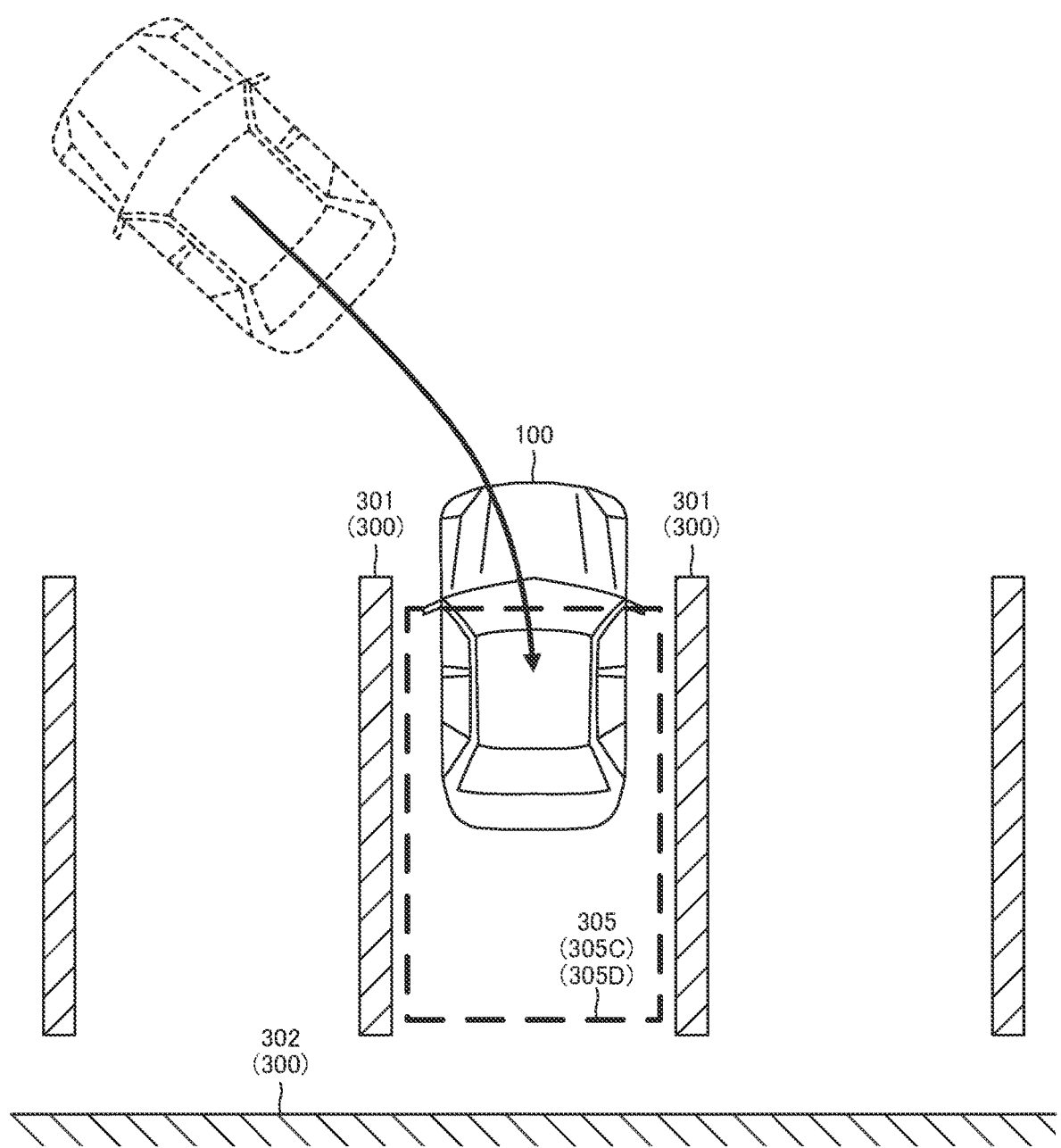
FIG. 11 is a view which shows a scene that the own vehicle is moved rearward while being turned left by the remote parking control.
Figure 12:
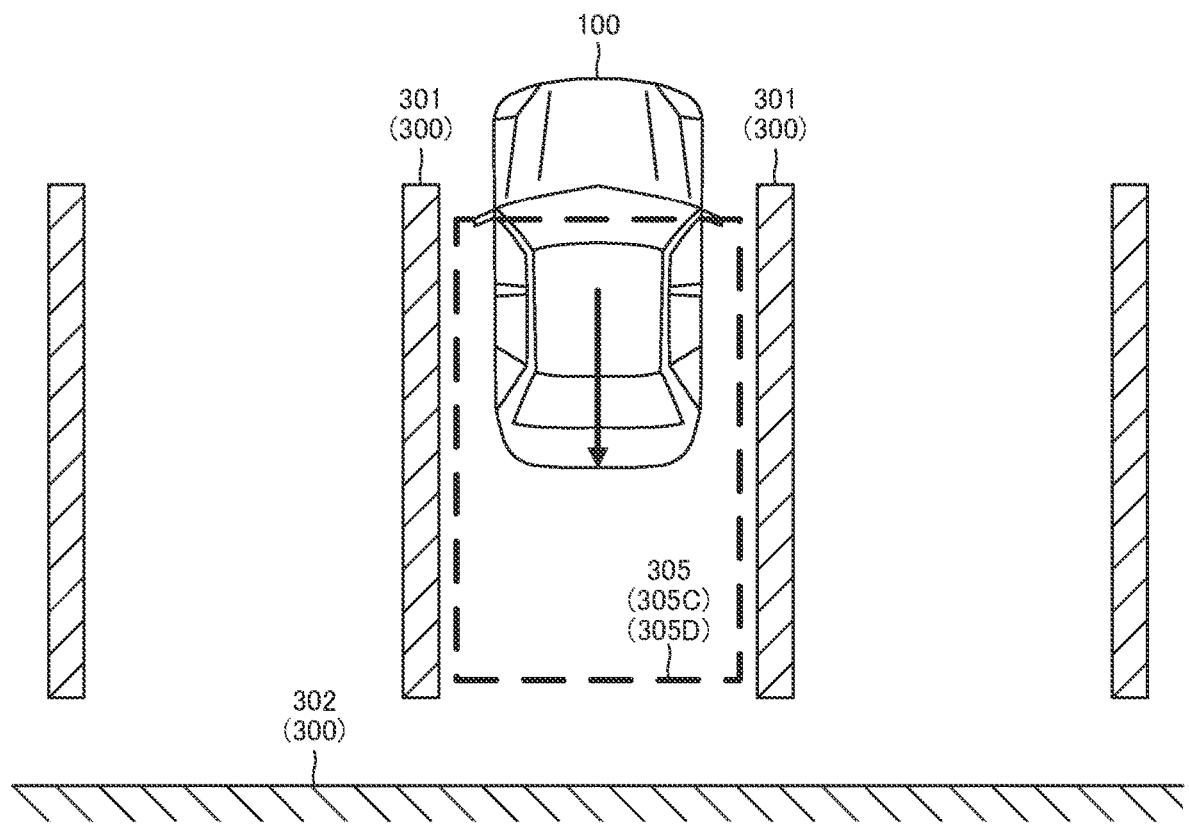
FIG. 12 is a view which shows a scene that the own vehicle is moved straight forward by the remote parking control.

When no movable obstacle in the designated parking space 305D is detected by the removing confirming process, the remote parking apparatus 10 continues to move the own vehicle 100 to turn the own vehicle 100 forward right as shown in FIG. 10. When the own vehicle 100 has been moved a predetermined distance, the remote parking apparatus 10 stops the own vehicle 100 as shown in FIG. 10. Then, as shown in FIG. 11, the remote parking apparatus 10 turns the own vehicle 100 rearward left, gradually decreasing the steering angle θ. The remote parking apparatus 10 steers the own vehicle 100 such that the steering angle θ becomes zero at a point of time when a longitudinal direction of the own vehicle 100 becomes parallel to a longitudinal direction of the designated parking space 305D. Then, as shown in FIG. 12, the remote parking apparatus 10 moves the own vehicle 100 rearward straight.

In this embodiment, the remote parking apparatus 10 controls the driving force output from the driving apparatus 21 and the braking force output from the braking apparatus 22 such that the own vehicle moving speed V is maintained at a predetermined limit vehicle moving speed Vlimit or less while the own vehicle 100 is moved by the remote parking control.

Figure 13:
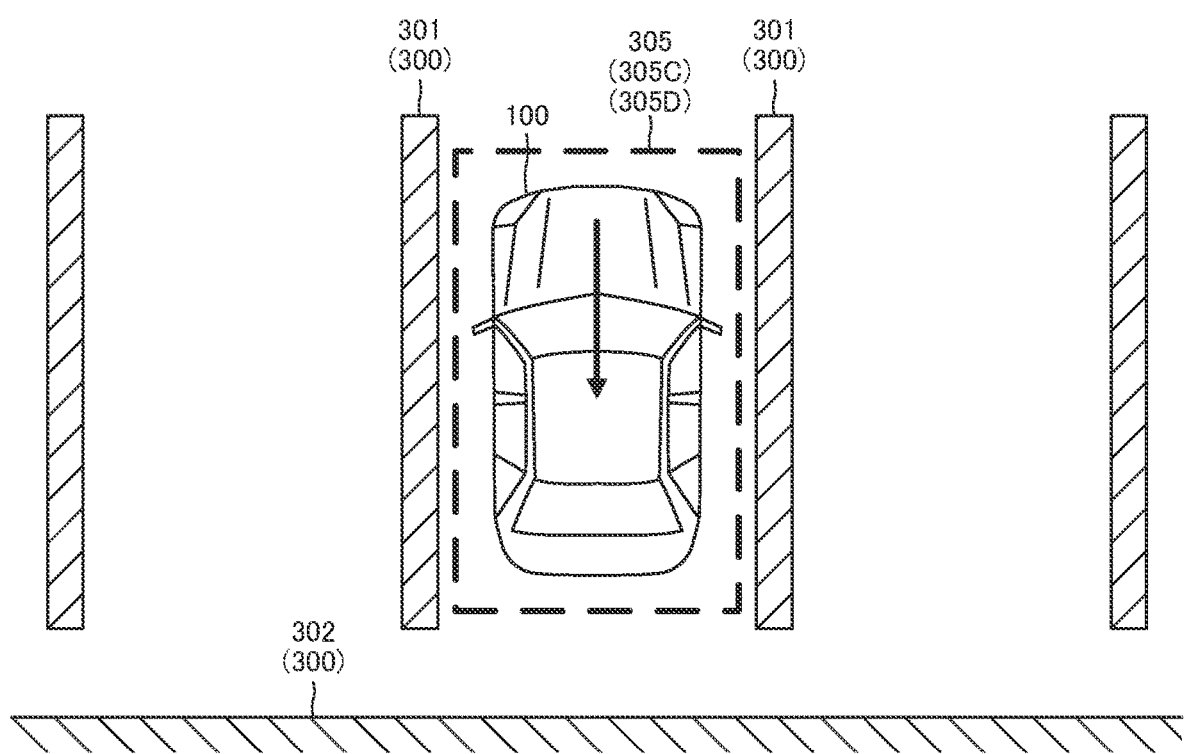
FIG. 13 is a view which shows a scene that parking the own vehicle in a designated parking space by the remote parking control is completed.

When parking the own vehicle 100 in the designated parking space 305D is completed as shown in FIG. 13, the remote parking apparatus 10 maintains the own vehicle 100 stopped by operating the parking brake apparatus 31 and terminates executing the remote parking control.

Figure 14:
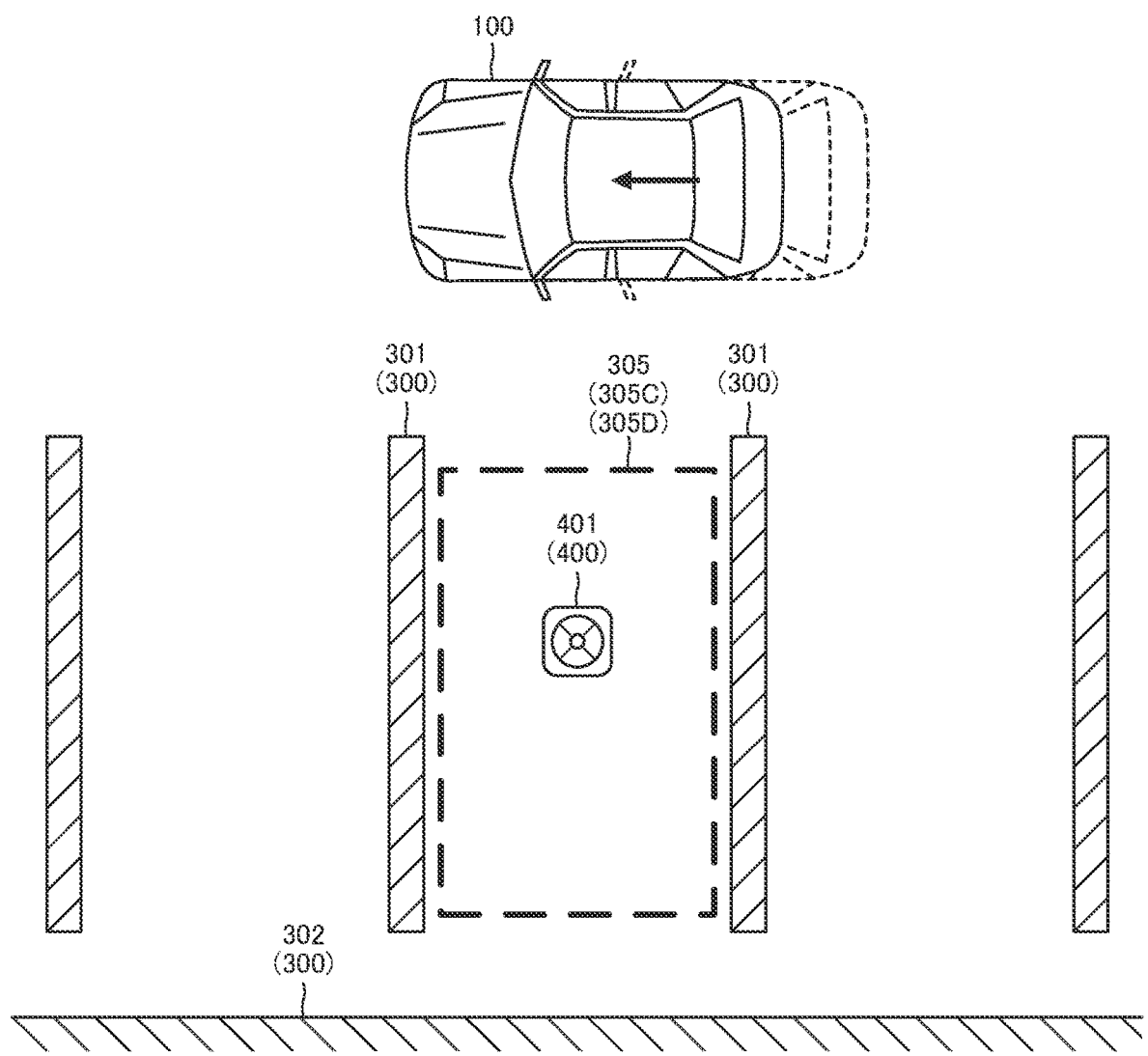
FIG. 14 is a view which shows a scene that the remote parking control is stopped.

On the other hand, as in the case shown in FIG. 14, when the movable obstacle 400 is detected in the designated parking space 305D by the removing confirming process, the remote parking apparatus 10 stops executing the remote parking control, stops the own vehicle 100 by the vehicle stopping process, and maintains the own vehicle 100 stopped by a vehicle stopped-state maintaining process. The vehicle stopping process of this embodiment is a process to stop the own vehicle 100 by the braking apparatus 22. Further, the vehicle stopped-state maintaining process is a process to maintain the own vehicle 100 stopped by operating the parking brake apparatus 31 or by controlling the operations of the transmission apparatus 24 so as to put the transmission apparatus 24 in the parking range state SP.

It should be noted that the remote parking apparatus 10 may be configured to wirelessly transmit a signal representing the remote parking control being stopped to the outside of the remote parking apparatus 10 when the remote parking apparatus 10 stops executing the remote parking control. In this case, the terminal control unit 210 may be configured to display an image showing the remote parking control being stopped on the terminal display 220 in response to receiving the signal representing the remote parking control being stopped.

Further, the remote parking apparatus 10 may be configured to control the operations of the braking apparatus 22 to stop the own vehicle 100, set a new target moving route Rtarget, i.e., set the target moving route Rtarget again, and start to move the own vehicle 100 when the own vehicle 100 needs to be stopped due to a fact that the own vehicle 100 probably contacts an object other than the movable obstacle 400 while the remote parking apparatus 10 moves the own vehicle 100 by the remote moving process.

The summary of the operations of the remote parking apparatus 10 has been described.

Advantages

If the designated parking space 305D can be set only after the movable obstacle 400 is removed from the available parking space 305C, the driver DR needs to take bothersome actions to get out of the own vehicle 100, remove the movable obstacle 400 from the available parking space 305C, get in the own vehicle 100, and set the designated parking space 305D.

With the remote parking apparatus 10, the driver DR can set the designated parking space 305D even when there is a movable obstacle 400 in the designated parking space 305D. Thus, the terminal user UR can park the own vehicle 100 in the designated parking space 305D by the remote parking control without taking bothersome actions.

In addition, as described above, with the remote parking apparatus 10, the driver DR can set the designated parking space 305D even when there is a movable obstacle 400 in the designated parking space 305D. In this case, the removing requirement images are displayed on the displaying device 71 and the terminal display 220, respectively. Thus, the driver DR can be informed of the movable obstacle 400 in the designated parking space 305D. Thus, the driver DR can be prompted to remove the movable obstacle 400. Thus, the driver DR can park the own vehicle 100 in the designated parking space 305D by the remote parking control.

In addition, with the remote parking apparatus 10, when removing the movable obstacle 400 is not confirmed after the own vehicle 100 starts to be moved by the remote parking control, the remote parking control is stopped. Thus, the own vehicle 100 can be prevented from contacting the movable obstacle 400.

<Specific Operations of Remote Parking Apparatus>

Figure 15:
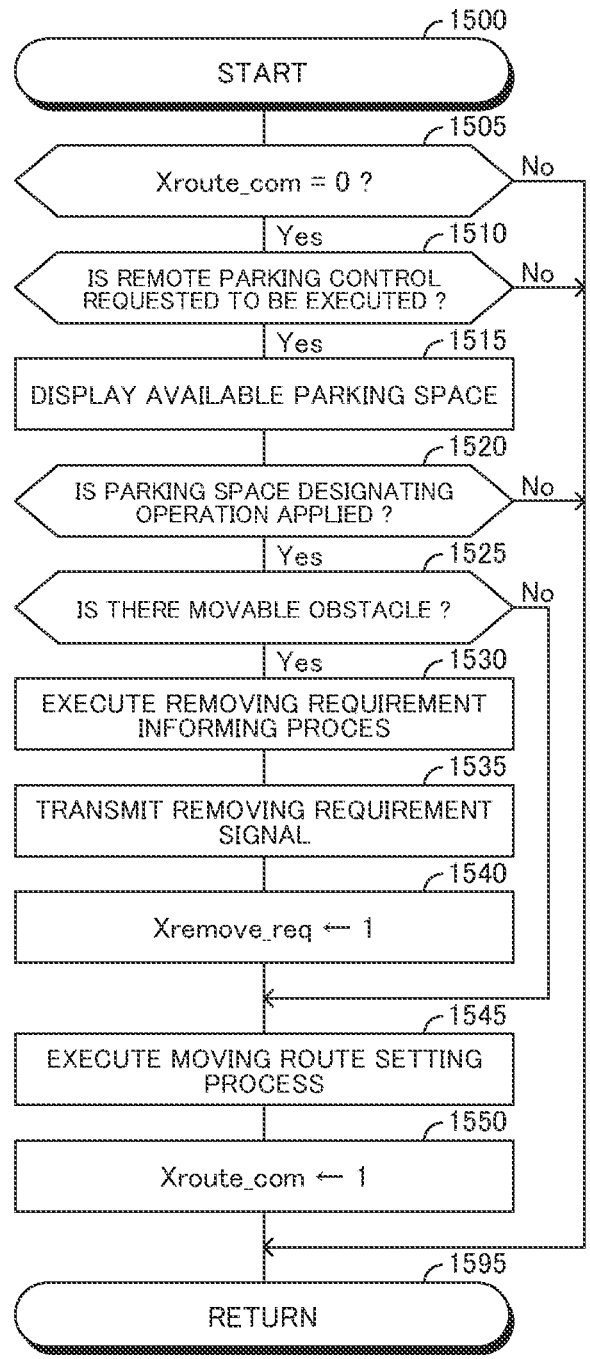
FIG. 15 is a view which shows a flowchart of a routine executed by the remote parking apparatus according to the embodiment of the invention.

Next, specific operations of the remote parking apparatus 10 will be described. The vehicle CPU 91 of the vehicle ECU 90 of the own vehicle 100 is configured or programmed to execute a routine shown in FIG. 15 with a predetermined calculation cycle. Thus, at a predetermined time, the vehicle CPU 91 starts a process from a step 1500 of the routine shown in FIG. 15 and proceeds with the process to a step 1505 to determine whether a value of a route setting complete flag Xroute_com is "0". The route setting complete flag Xroute_com is a flag which represents that the vehicle CPU 91 has completed setting the target moving route Rtarget. When the vehicle CPU 91 has completed setting the target moving route Rtarget, the value of the route setting complete flag Xroute is set to "1". On the other hand, when the vehicle CPU 91 has not completed setting the target moving route Rtarget, the value of the route setting complete flag Xroute_com is set to "0". In addition, when the vehicle CPU 91 stops or terminates executing the remote parking control, the value of the route setting complete flag Xroute_com is set to "0".

When the vehicle CPU 91 determines "Yes" at the step 1505, the vehicle CPU 91 proceeds with the process to a step 1510 to determine whether the remote parking control is requested to be executed.

When the vehicle CPU 91 determines "Yes" at the step 1510, the vehicle CPU 91 proceeds with the process to a step 1515 to execute the parking space detecting process to detect the available parking space 305C and display the detected available parking spaces 305C. Next, the vehicle CPU 91 proceeds with the process to a step 1520 to determine whether the parking space designating operation is applied to the remote parking apparatus 10.

When the vehicle CPU 91 determines "Yes" at the step 1520, the vehicle CPU 91 proceeds with the process to a step 1525 to execute the obstacle detecting process and determine whether there is a movable obstacle in the designated parking space 305D.

When the vehicle CPU 91 determines "Yes" at the step 1525, the vehicle CPU 91 proceeds with the process to a step 1530 to execute the removing requirement informing process. Next, the vehicle CPU 91 proceeds with the process to a step 1535 to wirelessly transmit the removing requirement signal Sremove_req to the outside of the remote parking apparatus 10. Next, the vehicle CPU 91 proceeds with the process to a step 1540 to set a value of a removing requirement flag Xremove_req to "1". The removing requirement flag Xremove_req is a flag which represents whether the vehicle CPU 91 has wirelessly transmitted the removing requirement signal Sremove_req to the outside of the remote parking apparatus 10. When the vehicle CPU 91 has wirelessly transmitted the removing requirement signal Sremove_req to the outside of the remote parking apparatus 10, the value of the removing requirement flag Xremove_req is set to "1". On the other hand, when the vehicle CPU 91 has not wirelessly transmitted the removing requirement signal Sremove_req to the outside of the remote parking apparatus 10, the value of the removing requirement flag Xremove_req is set to "0". In addition, when the vehicle CPU 91 stops or terminates executing the remote parking control, the value of the removing requirement flag Xremove_req is set to "0".

Next, the vehicle CPU 91 proceeds with the process to a step 1545.

On the other hand, when the vehicle CPU 91 determines "No" at the step 1525, the vehicle CPU 91 proceeds with the process directly to the step 1545.

When the vehicle CPU 91 proceeds with the process to the step 1545, the vehicle CPU 91 executes the moving route setting process to set the target moving route Rtarget. Next, the vehicle CPU 91 proceeds with the process to a step 1550 to set the value of the route setting complete flag Xroute_com to "1". Next, the vehicle CPU 91 proceeds with the process to a step 1595 to terminate executing this routine once.

Further, when the vehicle CPU 91 determines "No" at the step 1505, 1510, or 1520, the vehicle CPU 91 proceeds with the process directly to the step 1595 to terminate executing this routine once.

Figure 16:
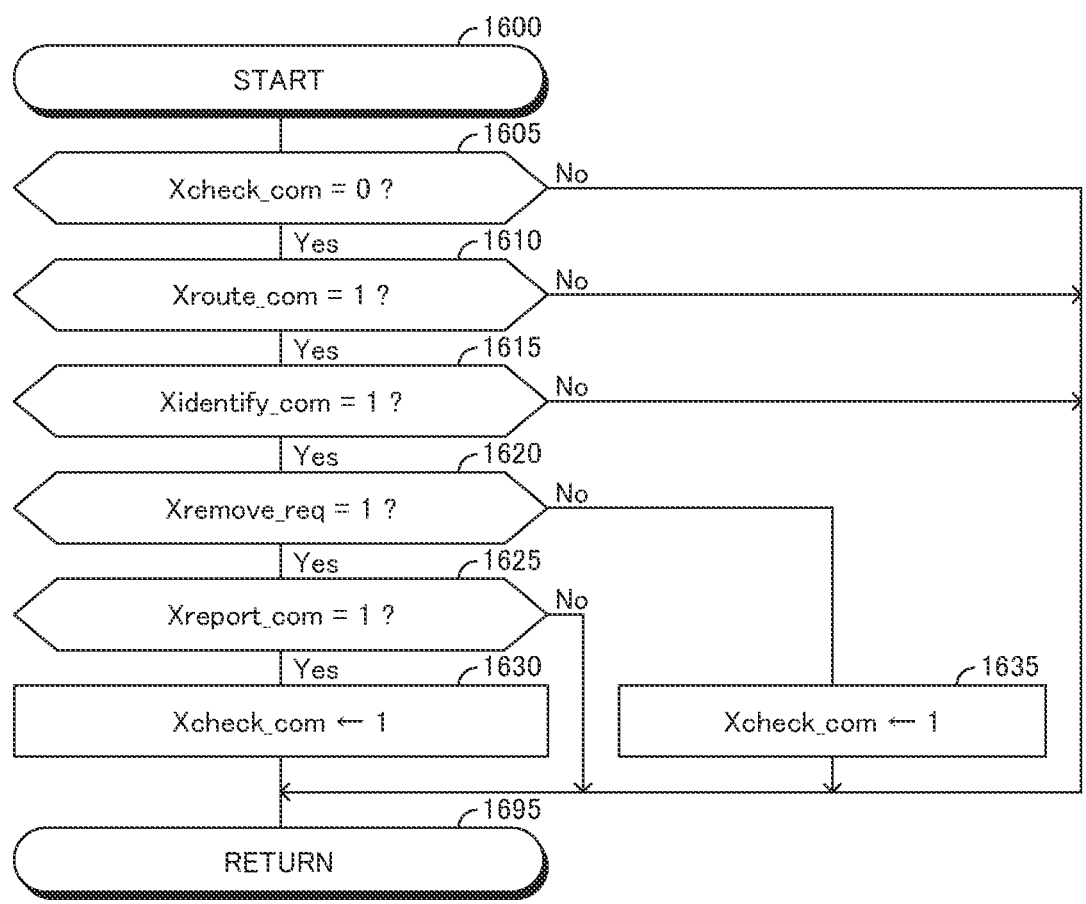
FIG. 16 is a view which shows a flowchart of a routine executed by the remote parking apparatus according to the embodiment of the invention.

Further, the vehicle CPU 91 is configured or programmed to execute a routine shown in FIG. 16 with the predetermined calculation cycle. Thus, at a predetermined time, the vehicle CPU 91 starts a process from a step 1600 of the routine shown in FIG. 16 and proceeds with the process to a step 1605 to determine whether a value of a removing confirmation complete flag Xcheck_com is "0". The removing confirmation complete flag Xcheck_com is a flag which represents whether the vehicle CPU 91 has completed confirming that there is no movable obstacle 400 in the designated parking space 305D. When the vehicle CPU 91 receives the removing complete report signal Sreport after the vehicle CPU 91 transmits the removing requirement signal Sremove_req, the value of the removing confirmation complete flag Xcheck_com is set to "1". In addition, when the vehicle CPU 91 has not transmitted the removing requirement signal Sremove_req, the value of the removing confirmation complete flag Xcheck_com is set to "1". On the other hand, when the vehicle CPU 91 has not received the removing complete report signal Sreport after the vehicle CPU 91 transmits the removing requirement signal Sremove_req, the value of the removing confirmation complete flag Xcheck_com is set to "0". In addition, when the vehicle CPU 91 stops or terminates executing the remote parking control, the value of the removing confirmation complete flag Xcheck_com is set to "0".

When the vehicle CPU 91 determines "Yes" at the step 1605, the vehicle CPU 91 proceeds with the process to a step 1610 to determine whether the value of the route setting complete flag Xroute_com is "1".

When the vehicle CPU 91 determines "Yes" at the step 1610, the vehicle CPU 91 proceeds with the process to a step 1615 to determine whether a value of a terminal identification complete flag Xidentify_com is "1". The terminal identification complete flag Xidentify_com is a flag which represents whether the vehicle CPU 91 has completed the terminal identifying process to determine whether the operation terminal 200 transmitting the application start signal Sapp_start is the registered operation terminal. When the vehicle CPU 91 has completed the terminal identifying process, the value of the terminal identification complete flag Xidentify_com is set to "1". On the other hand, when the vehicle CPU 91 has not completed the terminal identifying process, the value of the terminal identification complete flag Xidentify_com is set to "0". In addition, when the vehicle CPU 91 stops or terminates executing the remote parking control, the value of the terminal identification complete flag Xidentify_com is set to "0".

When the vehicle CPU 91 determines "Yes" at the step 1615, the vehicle CPU 91 proceeds with the process to a step 1620 to determine whether the value of the removing requirement flag Xremove_req is "1".

When the vehicle CPU 91 determines "Yes" at the step 1620, the vehicle CPU 91 proceeds with the process to a step 1625 to determine whether a value of a removing report complete flag Xreport_com is "1". The removing report complete flag Xreport_com is a flag which represents whether the vehicle CPU 91 has received the removing complete report signal Sreport. When the vehicle CPU 91 has received the removing complete report signal Sreport, the value of the removing report complete flag Xreport_com is set to "1". On the other hand, when the vehicle CPU 91 has not received the removing complete report signal Sreport, the value of the removing report complete flag Xreport_com is "0". In addition, when the vehicle CPU 91 stops or terminates executing the remote parking control, the value of the removing report complete flag Xreport_com is set to "0".

When the vehicle CPU 91 determines "Yes" at the step 1625, the vehicle CPU 91 proceeds with the process to a step 1630 to set the value of the removing confirmation complete flag Xcheck_com to "1". Next, the vehicle CPU 91 proceeds with the process to a step 1695 to terminate executing this routine once.

On the other hand, when the vehicle CPU 91 determines "No" at the step 1625, the vehicle CPU 91 proceeds with the process directly to a step 1695 to terminate executing this routine once.

Further, when the vehicle CPU 91 determines "No" at the step 1620, the vehicle CPU 91 proceeds with the process to a step 1635 to set the value of the removing confirmation complete flag Xcheck_com to "1". Next, the vehicle CPU 91 proceeds with the process to the step 1695 to terminate executing this routine once.

Further, when the vehicle CPU 91 determines "No" at the step 1605, 1610, or 1615, the vehicle CPU 91 proceeds with the process directly to the step 1695 to terminate executing this routine once.

Figure 17:
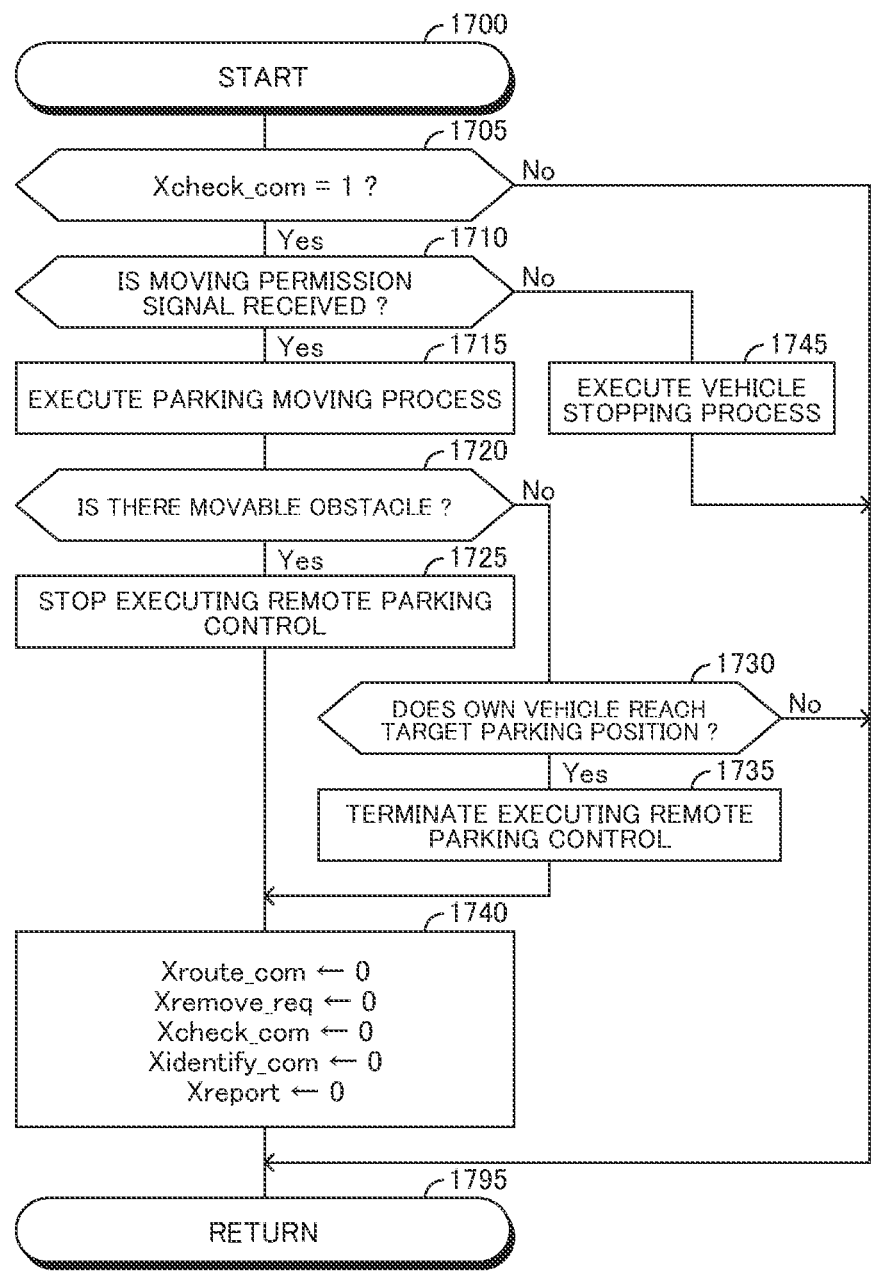
FIG. 17 is a view which shows a flowchart of a routine executed by the remote parking apparatus according to the embodiment of the invention.

Further, the vehicle CPU 91 is configured or programmed to execute a routine shown in FIG. 17 with the predetermined calculation cycle. Thus, at a predetermined time, the vehicle CPU 91 starts a process from a step 1700 and proceeds with the process to a step 1705 to determine whether the value of the removing confirmation complete flag Xcheck_com is "1".

When the vehicle CPU 91 determines "Yes" at the step 1705, the vehicle CPU 91 proceeds with the process to a step 1710 to determine whether to receive the moving permission signal Spermit.

When the vehicle CPU 91 determines "Yes" at the step 1710, the vehicle CPU 91 proceeds with the process to a step 1715 to execute the parking moving process. Next, the vehicle CPU 91 proceeds with the process to a step 1720 to execute the removing confirming process and determine whether there is a movable obstacle 400 in the designated parking space 305D.

When the vehicle CPU 91 determines "Yes" at the step 1720, the vehicle CPU 91 proceeds with the process to a step 1725 to stop executing the remote parking control, execute the vehicle stopping process, and execute the vehicle stopped-state maintaining process. Next, the vehicle CPU 91 proceeds with the process to a step 1740 to set the values of the route setting complete flag Xroute_com, the removing requirement flag Xremove_req, the removing confirmation complete flag Xcheck_com, the terminal identification complete flag Xidentify_com, and the removing report complete flag Xreport_com to "0". Next, the vehicle CPU 91 proceeds with the process to a step 1795 to terminate executing this routine once.

On the other hand, when the vehicle CPU 91 determines "No" at the step 1720, the vehicle CPU 91 proceeds with the process to a step 1730 to determine whether the own vehicle 100 reaches a target parking position Ptarget. The target parking position Ptarget is a position where the own vehicle 100 reaches when parking the own vehicle 100 in the designated parking space 305D is completed.

When the vehicle CPU 91 determines "Yes" at the step 1730, the vehicle CPU 91 proceeds with the process to a step 1735 to terminate executing the remote parking control, execute the vehicle stopping process, and execute the vehicle stopped-state maintaining process. Next, the vehicle CPU 91 proceeds with the process to the step 1740 to execute the process described above. Next, the vehicle CPU 91 proceeds with the process to the step 1795 to terminate executing this routine once.

On the other hand, when the vehicle CPU 91 determines "No" at the step 1730, the vehicle CPU 91 proceeds with the process directly to the step 1795 to terminate executing this routine once.

Further, when the vehicle CPU 91 determines "No" at the step 1710, the vehicle CPU 91 proceeds with the process to a step 1745 to execute the vehicle stopping process. Next, the vehicle CPU 91 proceeds with the process to the step 1795 to terminate executing this routine once.

Further, when the vehicle CPU 91 determines "No" at the step 1705, the vehicle CPU 91 proceeds with the process directly to the step 1795 to terminate executing this routine once.

Figure 18:
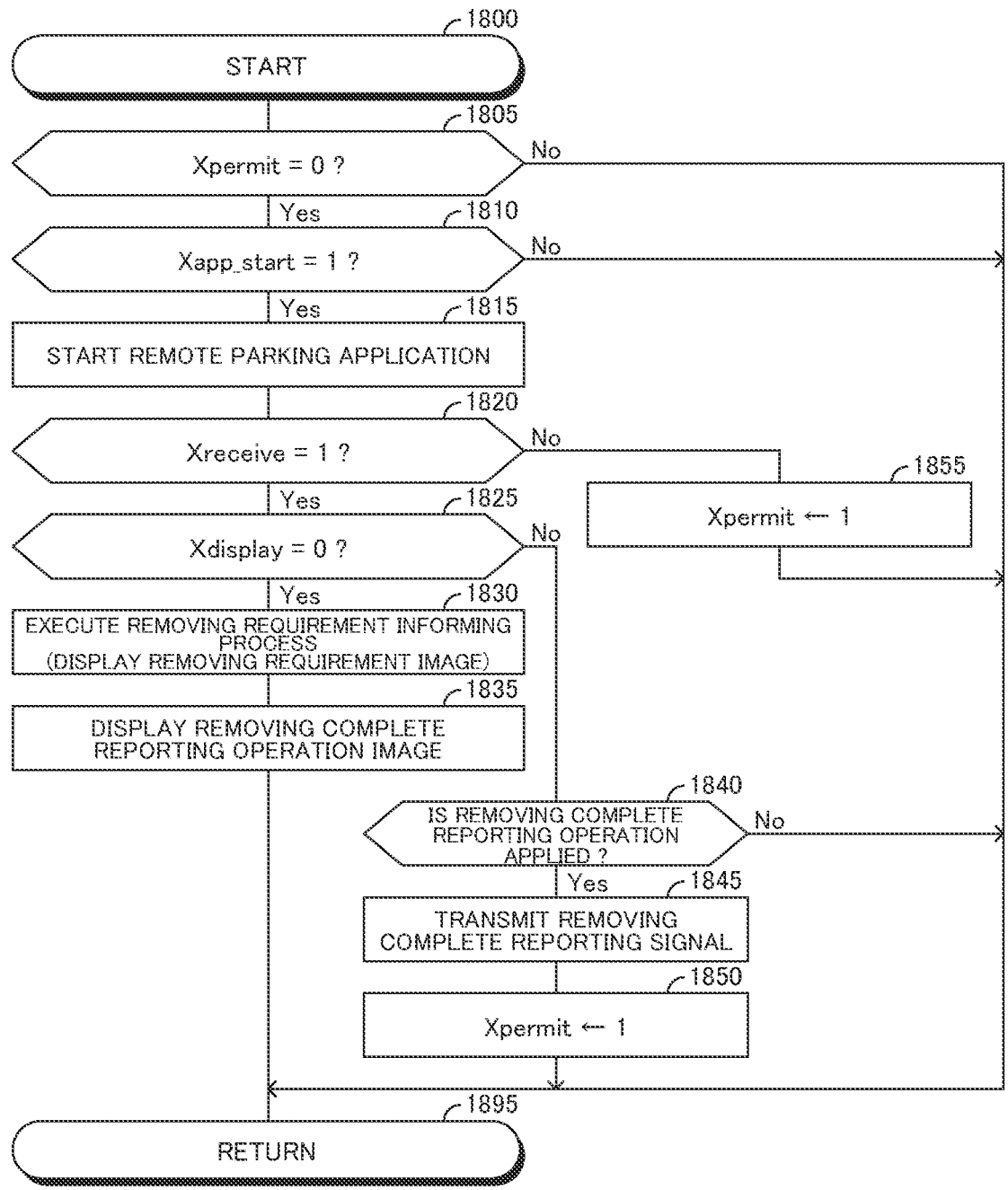
FIG. 18 is a view which shows a flowchart of a routine executed by the remote parking apparatus according to the embodiment of the invention.

Further, the terminal CPU 291 of the terminal ECU 290 of the terminal control unit 210 is configured or programmed to execute a routine shown in FIG. 18 with the predetermined calculation cycle. Thus, at a predetermined time, the terminal CPU 291 starts a process from a step 1800 of the routine shown in FIG. 18 and proceeds with the process to a step 1805 to determine whether a value of a moving operation permission flag Xpermit is "0". The moving operation permission flag Xpermit is a flag which represents whether the removing complete reporting operation is applied to the terminal control unit 210. When the removing complete reporting operation is applied to the terminal control unit 210, the value of the moving operation permission flag Xpermit is set to "1". Thus, when the removing complete reporting operation has not been applied to the terminal control unit 210, the value of the moving operation permission flag Xpermit is set to "0".

When the terminal CPU 291 determines "Yes" at the step 1805, the terminal CPU 291 proceeds with the process to a step 1810 to determine whether a value of an application start request flag Xapp_req is "1". The application start request flag Xapp_req is a flag which represents whether the application starting operation is applied to the terminal control unit 210. When the application starting operation is applied to the terminal control unit 210, the value of the application start request flag Xapp_req is set to "1". Thus, when the application starting operation has not been applied to the terminal control unit 210, the value of the application start request flag Xapp_req is set to "0".

When the terminal CPU 291 determines "Yes" at the step 1810, the terminal CPU 291 proceeds with the process to a step 1815 to start the remote parking application. Next, the terminal CPU 291 proceeds with the process to a step 1820 to determine a value of a removing requirement receiving flag is "1". The removing requirement receiving flag Xreceive is a flag which represents whether the terminal CPU 291 receives the removing requirement signal Sremove_req. When the terminal CPU 291 receives the removing requirement signal Sremove_req, the value of the removing requirement receiving flag Xreceive is set to "1". Thus, when the terminal CPU 291 has not received the removing requirement signal Sremove_req, the value of the removing requirement receiving flag Xreceive is set to "0".

When the terminal CPU 291 determines "Yes" at the step 1820, the terminal CPU 291 proceeds with the process to a step 1825 to determine whether a value of a removing requirement image displaying flag Xdisplay is "0". The removing requirement image displaying flag Xdisplay is a flag which represents whether the removing requirement image is displayed on the terminal display 220. When the removing requirement image is displayed on the terminal display 220, the value of the removing requirement image displaying flag Xdisplay is set to "1". Thus, when the removing requirement image is not displayed on the terminal display 220, the value of the removing requirement image displaying flag Xdisplay is set to "0".

When the terminal CPU 291 determines "Yes" at the step 1825, the terminal CPU 291 proceeds with the process to a step 1830 to execute the removing requirement informing process. That is, the terminal CPU 291 displays the removing requirement image on the terminal display 220. Next, the terminal CPU 291 proceeds with the process to a step 1835 to display the removing complete reporting operation image on the terminal display 220. Next, the terminal CPU 291 proceeds with the process to a step 1895 to terminate executing this routine once.

On the other hand, when the terminal CPU 291 determines "No" at the step 1825, the terminal CPU 291 proceeds with the process to a step 1840 to determine whether the removing complete reporting operation is applied to the terminal control unit 210.

When the terminal CPU 291 determines "Yes" at the step 1840, the terminal CPU 291 proceeds with the process to a step 1845 to wirelessly transmit the removing complete report signal Sreport to the outside of the terminal control unit 210. Next, the terminal CPU 291 proceeds with the process to a step 1850 to set the value of the moving operation permission flag Xpermit to "1". Next, the terminal CPU 291 proceeds with the process to the step 1895 to terminate executing this routine once.

On the other hand, when the terminal CPU 291 determines "No" at the step 1840, the terminal CPU 291 proceeds with the process directly to the step 1895 to terminate executing this routine once.

Further, when the terminal CPU 291 determines "No" at the step 1820, the terminal CPU 291 proceeds with the process to a step 1855 to set the value of the moving operation permission flag Xpermit to "1". Next, the terminal CPU 291 proceeds with the process to the step 1895 to terminate executing this routine once.

Furthermore, when the terminal CPU 291 determines "No" at the step 1805 or 1810, the terminal CPU 291 proceeds with the process directly to the step 1895 to terminate executing this routine once.

Figure 19:
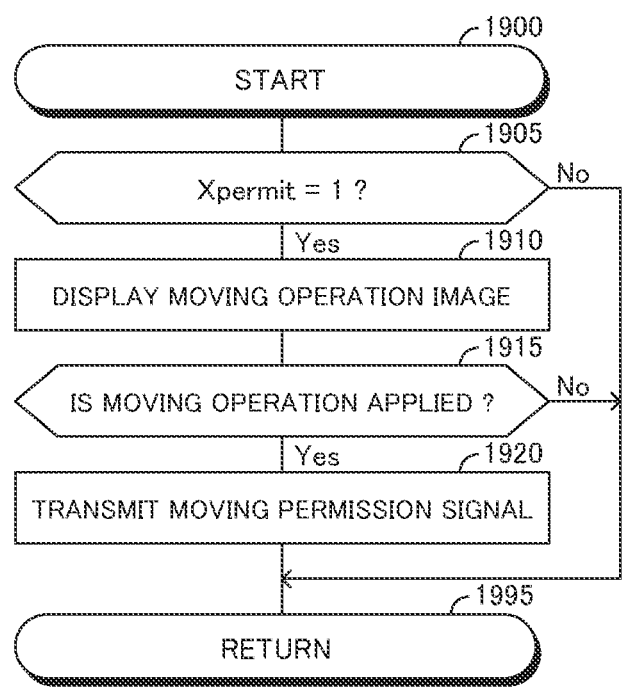
FIG. 19 is a view which shows a flowchart of a routine executed by the remote parking apparatus according to the embodiment of the invention.

Further, the terminal CPU 291 is configured or programmed to execute a routine shown in FIG. 19 with the predetermined calculation cycle. Thus, at a predetermined time, the terminal CPU 291 starts a process from a step 1900 of the routine shown in FIG. 19 and proceeds with the process to a step 1905 to determine whether the value of the moving operation permission flag Xpermit is "1".

When the terminal CPU 291 determines "Yes" at the step 1905, the terminal CPU 291 proceeds with the process to a step 1910 to display the moving operation image on the terminal display 220. Next, the terminal CPU 291 proceeds with the process to a step 1915 to determine whether the moving operation is applied to the terminal control unit 210.

When the terminal CPU 291 determines "Yes" at the step 1915, the terminal CPU 291 proceeds with the process to a step 1920 to wirelessly transmit the moving permission signal Spermit to the outside of the terminal control unit 210. Next, the terminal CPU 291 proceeds with the process to a step 1995 to terminate executing this routine once.

On the other hand, when the terminal CPU 291 determines "No" at the step 1915, the terminal CPU 291 proceeds with the process directly to the step 1995 to terminate executing this routine once.

Further, when the terminal CPU 291 determines "No" at the step 1905, the terminal CPU 291 proceeds with the process directly to the step 1995 to terminate executing this routine once.

The specific operations of the remote parking apparatus 10 have been described.

It should be noted that the invention is not limited to the aforementioned embodiments, and various modifications can be employed within the scope of the invention.

The invention claimed is:

1. A remote parking apparatus comprising an electronic control unit which executes a remote parking control to move an own vehicle and park the own vehicle in a designated parking space in response to receiving a signal transmitted wirelessly from an operation terminal,
wherein the own vehicle is installed with a remote parking request operation device operated by a driver in the own vehicle,
wherein the electronic control unit is configured to:
execute a parking space detecting process to detect a parking space where the own vehicle can be parked in response to the driver operating the remote parking request operation device;
set the detected parking space as the designated parking space in response to the driver operating the remote parking request operation device in the own vehicle even when there is a movable obstacle interrupting parking the own vehicle in the detected parking space;
execute an obstacle detecting process to detect the movable obstacle interrupting parking the own vehicle in the designated parking space;
execute an informing process to require removing the obstacle from the designated parking space when the electronic control unit sets the parking space in which the movable obstacle exists as the designated parking space;
execute the remote parking control in response to receiving the signal transmitted wirelessly from the operation terminal to indicate the detected movable obstacle has been completely removed.

2. The remove parking apparatus as set forth in claim 1, wherein the informing process is a process to inform requiring the driver of the own vehicle to remove the detected movable obstacle from the designated parking space.

3. The remove parking apparatus as set forth in claim 1, where in the informing process is a process to inform requiring a user of the operation terminal to remove the detected movable obstacle from the designated parking space.

4. The remote parking apparatus as set forth in claim 1, wherein the electronic control unit is configured to stop executing the remote parking control when the electronic control unit detects the movable obstacle while the electronic control unit moves the own vehicle by the remote parking control after the electronic control unit sets the parking space in which the movable obstacle exists as the designated parking space.

5. The remote parking apparatus as set forth in claim 1, wherein the parking space detecting process includes:
detecting space defining objects based on surrounding detection information,
determining a space defined by the space defining objects, and
detecting the space where no vehicle parks as an available parking space, and
wherein the space defining objects include markings on a ground around the own vehicle or walls around the own vehicle.

6. The remote parking apparatus as set forth in claim 1, wherein the obstacle detecting process includes:
a first process to detect the movable obstacle in the designated parking space using a triangulation technique based on image information, the image information being information regarding a surrounding of the own vehicle based on images,
a second process to detect the movable obstacle in the designated parking space based on radio wave information, the radio wave information being information on objects surrounding the own vehicle based on radio waves, and
a third process to detect the movable obstacle in the designated parking space as detection results of the first process and the second process.

7. The remote parking apparatus as set forth in claim 5, wherein
when available spaces are detected side by side on a left side of the own vehicle, the electronic control unit is configured to set the designated parking space as the parking space at a direct left side of the own vehicle.

8. The remote parking apparatus as set forth in claim 5, wherein
when available spaces are detected side by side on a right side of the own vehicle, the electronic control unit is configured to set the designated parking space as the parking space at a direct right side of the own vehicle.

* * * * *